(12) United States Patent
Kim

(10) Patent No.: US 8,674,543 B2
(45) Date of Patent: Mar. 18, 2014

(54) ELECTRONIC DEVICE FOR CONTROLLING CONSUMPTION POWER AND METHOD OF OPERATING THE SAME

(75) Inventor: Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 541 days.

(21) Appl. No.: 12/976,767

(22) Filed: Dec. 22, 2010

(65) Prior Publication Data
US 2012/0161517 A1   Jun. 28, 2012

(51) Int. Cl.
H02J 3/14 (2006.01)
(52) U.S. Cl.
USPC .......................................... 307/31
(58) Field of Classification Search
USPC .......................................... 307/31
See application file for complete search history.

(56) References Cited

U.S. PATENT DOCUMENTS

| | | | |
|---|---|---|---|
| 6,046,513 A | 4/2000 | Jouper et al. | |
| 6,633,823 B2 * | 10/2003 | Bartone et al. | 702/57 |
| 8,457,038 B1 * | 6/2013 | Xue et al. | 370/318 |
| 2010/0156178 A1 | 6/2010 | Holmberg | |
| 2011/0099401 A1 * | 4/2011 | Steinle et al. | 713/323 |
| 2011/0153108 A1 * | 6/2011 | Yoon et al. | 700/295 |
| 2012/0226572 A1 * | 9/2012 | Park et al. | 705/26.1 |

FOREIGN PATENT DOCUMENTS

| | | |
|---|---|---|
| JP | 2004-104863 A | 4/2004 |
| JP | 2008-306835 A | 12/2008 |
| JP | 2009-254219 A | 10/2009 |

* cited by examiner

Primary Examiner — Jared Fureman
Assistant Examiner — Duc M Pham
(74) Attorney, Agent, or Firm — Birch, Stewart, Kolasch & Birch, LLP

(57) ABSTRACT

An aspect of the present invention relates to a method of restricting power consumption of an electronic device. The method includes a request reception step of receiving a power consumption restriction request including a restricted power consumption value and a response transmission step of sending a response to the power consumption restriction request on the basis of the restricted power consumption value and a required power consumption value necessary for an operation.

27 Claims, 19 Drawing Sheets

FIG.8

Electronic devices now being operated are as follows.
Please select importance of each operation. — 33a

| Device | Operation | Remark |
|---|---|---|
| Air conditioner | Cooling | Set temperature 24°C |
| TV | Watching | Gone with the wind |
| Electric rice-cooker | Schedule cooking | Scheduled time 6 P.M. |
| Computer | Download | Update file |
| Computer | File backup | Regular file backup |

It is now necessary to secure redundant power of XXX.
Please select operation(s) to be stopped from among the
following operations. (When you select restart CHECK BOX,
the stopped operation will be restarted later.) — 33a

| Device | Operation | Remark | Power consumption | CHECK BOX |
|---|---|---|---|---|
| Air conditioner | Cooling | Set temperature 24°C | AAA | ☐ |
| TV | Watching | Gone with the wind | BBB | ☐ |
| Electric rice-cooker | Schedule cooking | Scheduled time 6 P.M. | CCC | ☐ |
| Computer | Download | Update file | DDD | ☐ |
| Computer | File backup | Regular file backup | EEE | ☑ |

| Mode | Communication unit | Input unit | Display unit | Sound output unit | Memory unit | Power supply unit | Control unit | Total amount |
|---|---|---|---|---|---|---|---|---|
| Maximum performance | 100 | 100 | 200 | 100 | 100 | 100 | 100 | 800 |
| Movie watching | 90 | 90 | 200 | 100 | 90 | 90 | 90 | 750 |
| Listening to music | 90 | 90 | 10 | 100 | 90 | 90 | 90 | 560 |
| Watching stored contents | 10 | 90 | 200 | 100 | 90 | 90 | 90 | 670 |
| Watching broadcasting contents | 90 | 90 | 200 | 100 | 30 | 90 | 90 | 690 |
| First power-saving | 80 | 80 | 150 | 80 | 80 | 50 | 80 | 600 |
| Second power-saving | 70 | 70 | 130 | 70 | 70 | 0 | 70 | 480 |
| Maximum power-saving | 50 | 50 | 100 | 50 | 50 | 0 | 50 | 350 |
| Battery charge | 0 | 0 | 0 | 0 | 0 | 100 | 0 | 100 |

FIG.16

| Mode | Communication unit | Input unit | Output unit | Cooling unit | Ventilation unit | Suction unit | Total amount |
|---|---|---|---|---|---|---|---|
| Quick air cooling | 100 | 100 | 100 | 300 | 200 | 200 | 1000 |
| Common air cooling | 80 | 80 | 80 | 250 | 150 | 150 | 790 |
| Dehumidifcation | 80 | 80 | 80 | 100 | 150 | 150 | 640 |
| Ventilation | 80 | 80 | 80 | 0 | 150 | 150 | 540 |
| First power-saving | 70 | 70 | 70 | 150 | 150 | 150 | 660 |
| Second power-saving | 50 | 50 | 50 | 100 | 100 | 100 | 450 |
| Maximum power-saving | 10 | 10 | 10 | 100 | 100 | 100 | 330 |

FIG.18

| Mode | | Communication unit | Input unit | Output unit | Cooling unit | Circulation unit | Defrosting unit | Total amount |
|---|---|---|---|---|---|---|---|---|
| Quick freezing | | 100 | 100 | 100 | 200 | 200 | 50 | 750 |
| Supercooling | A | 100 | 100 | 100 | 200 | 100 | 50 | 650 |
| | B | 10 | 10 | 10 | 50 | 50 | 0 | 130 |
| Defrosting | | 100 | 100 | 100 | 150 | 100 | 200 | 750 |
| First power-saving | | 80 | 80 | 80 | 150 | 80 | 50 | 520 |
| Second power-saving | | 50 | 50 | 50 | 150 | 80 | 30 | 410 |
| Maximum power-saving | | 10 | 10 | 10 | 120 | 50 | 20 | 320 |

FIG.20

| Mode | Communication unit | Input unit | Output unit | Cooling unit | Ventilation unit | Suction unit | Total amount |
|---|---|---|---|---|---|---|---|
| Maximum performance | 100 | 100 | 300 | 100 | 100 | 200 | 900 |
| Internet | 100 | 80 | 200 | 100 | 100 | 100 | 680 |
| Multimedia | 80 | 80 | 300 | 100 | 100 | 150 | 810 |
| Document task | 50 | 100 | 150 | 80 | 100 | 150 | 630 |
| First power-saving | 80 | 80 | 200 | 80 | 50 | 150 | 640 |
| Second power-saving | 70 | 70 | 150 | 70 | 0 | 150 | 580 |
| Maximum power-saving | 50 | 50 | 100 | 50 | 0 | 150 | 580 |
| Battery charge | 0 | 0 | 0 | 0 | 100 | 0 | 100 |

ELECTRONIC DEVICE FOR CONTROLLING CONSUMPTION POWER AND METHOD OF OPERATING THE SAME

BACKGROUND OF THE INVENTION

1. Field of the Invention

The present invention relates to an electronic device operating within restricted power consumption and a method of controlling the same.

2. Discussion of the Related Art

As energy saving and efficiency recently become problematic, the introduction of a smart power grid (that is, a smart grid) for the efficiency of power in power consumers becomes a big issue. If the smart power grid is introduced, a flexible rate system in which electric rates is varied according to a power demand can be introduced.

In line with the trend, there is a need for the development of technology which can efficiently control a variety of electronic devices used at homes in connection with the introduction of the smart grid.

SUMMARY OF THE INVENTION

It is an object of the present invention to provide an electronic device configured to receive a restriction request for power consumption necessary for an operation and operated according to operating power determined on the basis of the request and a method of controlling the same.

The technical objects to be achieved by the present invention are not limited to the above-described object, and other technical objects that have not been described above will be evident to those skilled in the art from the following description.

To achieve the above object, an electronic device according to an aspect of the present invention includes a communication unit and a control unit for receiving a power restriction request, including a restricted power value, through the communication unit, sending a response to the power restriction request on the basis of the restricted power value and a required power value necessary for an operation, and determining a restricted operating power for restricting power consumption by taking the restricted power value and the required power value into consideration.

A method of restricting power consumption of an electronic device according to another aspect of the present invention includes a request reception step of receiving a power consumption restriction request including a restricted power consumption value and a response transmission step of sending a response to the power consumption restriction request on the basis of the restricted power consumption value and a required power consumption value necessary for an operation.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a diagram showing a user interface in which the energy management system queries a user about the order of priority;

FIG. 9 is a diagram showing a user interface in which the energy management system queries a user about an electronic device to be stopped;

FIG. 12 is a diagram illustrating the operating modes of an electronic device according to an embodiment of the present invention;

FIG. 16 is a diagram showing a table in which various operating modes that can be set up in the air conditioner are matched with the amounts of electric power assigned to respective components according to an embodiment of the present invention;

FIG. 18 is a diagram showing a table in which various operating modes that can be set up in the refrigerator are matched with the amounts of electric power assigned to respective components;

FIG. 20 is a diagram showing a table in which various operating modes that can be set up in the PC are matched with the amounts of electric power assigned to respective components.

DETAILED DESCRIPTION OF THE PREFERRED EMBODIMENTS

Figure 1:
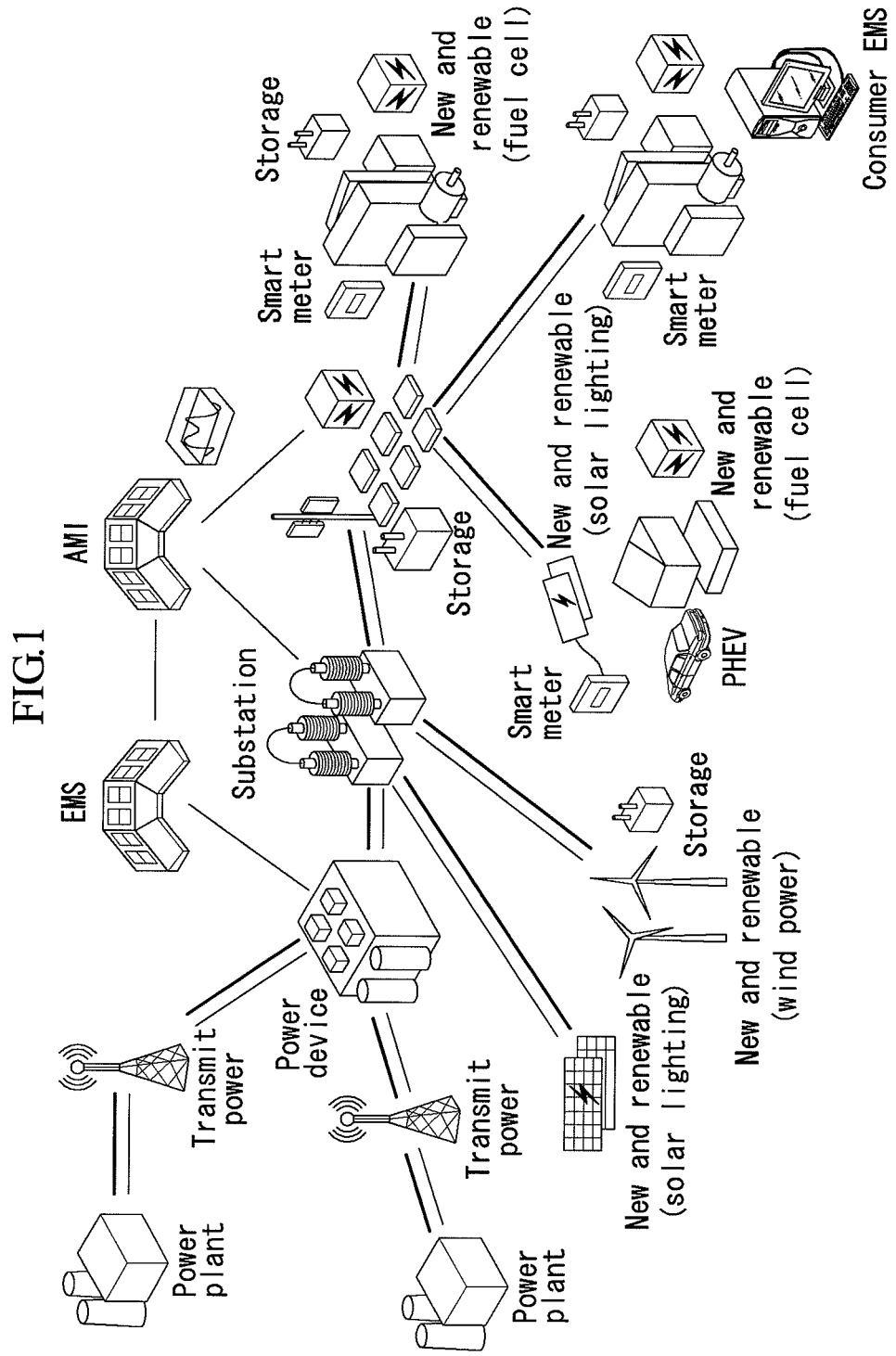
FIG. 1 is a diagram showing a schematic construction of a smart grid.

The above objects, characteristics, and merits of the invention will become more apparent from the following detailed description taken in conjunction with the accompanying drawings. Some embodiments of the present invention will now be described in detail with reference to the accompanying drawings. The same reference numerals designate the same elements throughout the drawings. Further, detailed descriptions of n the known functions or constructions will be omitted if they are deemed to make the gist of the present invention unnecessarily vague.

<General System Configuration>

FIG. 1 is a diagram showing a schematic construction of a smart grid. The smart grid includes a power plant for generating power through thermal power generation, nuclear power generation, or waterpower generation and a solar lighting plant and a wind power plant for generating power by using solar lighting or wind power which is new and renewable energy.

The thermal power plant, the nuclear power plant, or the waterpower plant sends power to a power plant through power-transmission lines, and the power plant sends electricity to a substation so that the electricity may be assigned to consumers, such as homes or offices.

Further, electricity generated by new and renewable energy is sent to a substation so that the electricity is assigned to each consumer. The electricity transmitted by the substation is assigned to offices or homes via a power storage device.

A home using a Home Area Network (HAN) may also generate electricity by using solar lighting or a fuel cell mounted in a Plug in Hybrid Electric Vehicle (PHEV) and supply the generated electricity. The remaining may be sold externally.

An office or a home equipped with a smart measuring device or a smart server or both may check power and electric rates, used by each consumer, in real time. A user may check the power and electric rates being used on the basis of the checked power and electric rates and adopt proper means for reducing power consumption or electric rates according to circumstances.

Meanwhile, the power plant, the power plant, the storage device, and the consumer may bi-directionally communicate with each other. Accordingly, not only electricity may be one-sidedly supplied to the consumer, but also electricity may be generated and assigned according to circumstances of the consumer by informing the storage device, the power plant, and the power plant of conditions of the consumer.

In the smart grid, an energy management system (EMS), being in change of real-time power management for the consumer and the real-time expectation of required power, and an advanced metering infrastructure (AMI), being in charge of the real-time metering of power consumption, play a pivotal role.

In the smart grid, the advance metering infrastructure (AMI) is a basic technology intended to integrate consumers on the basis of an open architecture. The advance metering infrastructure (AMI) enables a consumer to efficiently use electricity and provides a power supplier with an ability to efficiently operate a system by detecting problems in the system.

The open architecture, unlike in a common communication network, refers to a criterion in which all electric devices may be interconnected in the smart grid system irrespective of whether the electric devices are manufactured by which manufacturer.

Accordingly, the advance metering infrastructure (AMI) used in the smart grid enables a consumer-friendly efficiency concept, such as "prices to devices."

That is, a real-time price signal in the power market is relayed through the energy management system (EMS) installed at each home. The energy management system (EMS) controls the real-time price signal through communication with each electric device. Accordingly, a user may check power information about each electric device, while seeing the energy management system (EMS), and perform power information processing, such as power consumption or setting up an electric rate limit, on the basis of the power information, thereby being capable of reducing energy and costs.

Here, the energy management system (EMS) may include local energy management systems (EMS) used in offices or homes and a central energy management system (EMS) configured to process pieces of information, combined by the local energy management systems (EMS), through bidirectional communication with the local energy management systems (EMS). Meanwhile, in the present specification, the term 'energy management system (EMS)'? is used, but the energy management system (EMS) may also be referred to as another terminology, such as a smart server, a smart home server, a power management server, a home server, or a similar name.

In the smart grid, communication regarding power information between a supplier and a consumer may be performed in real time. Accordingly, a 'real-time power network response' may be realized, and thus costs necessary to satisfy a peak demand may be reduced.

Figure 2:
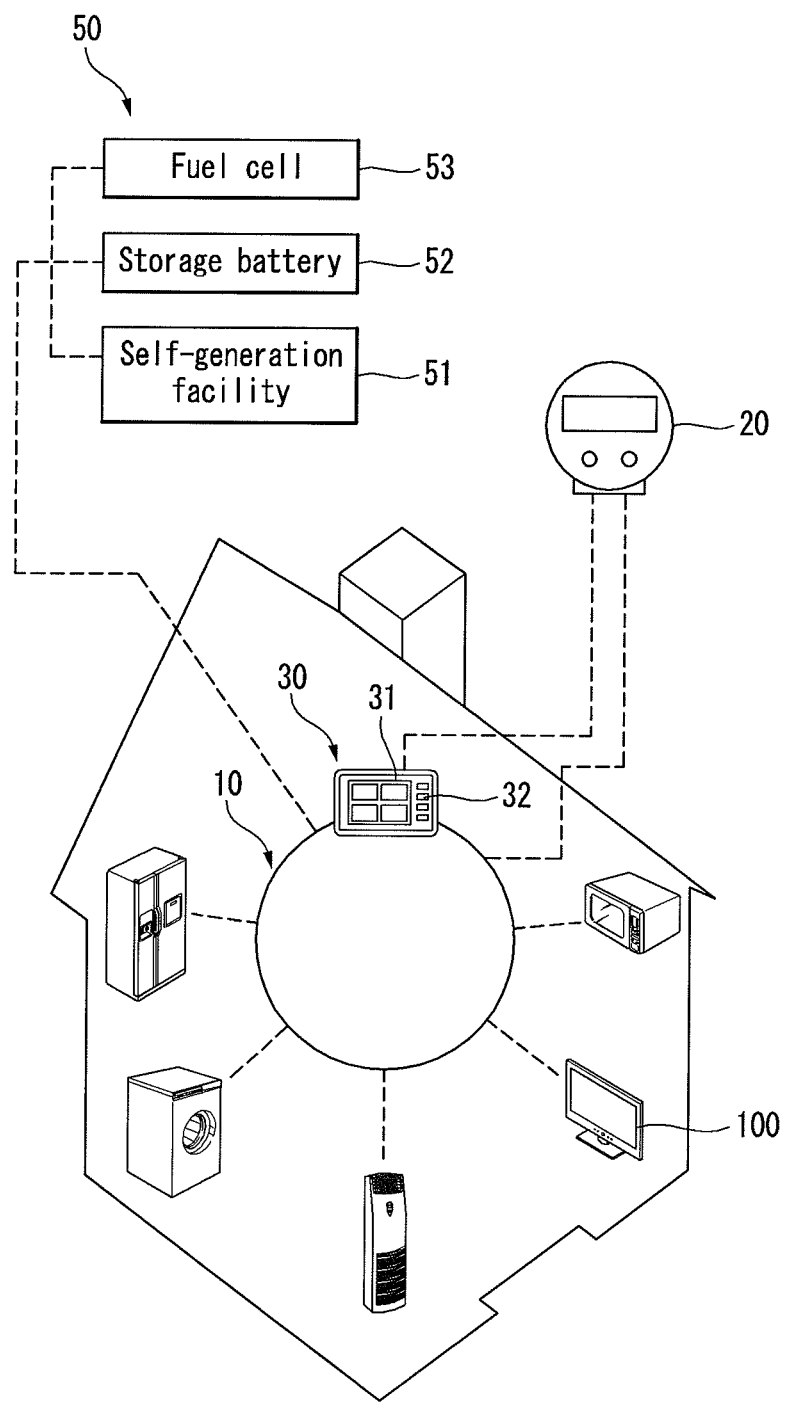
FIG. 2 is a diagram illustrating a power management network according to an embodiment of the present invention.

FIG. 2 is a diagram illustrating a power management network 10 at a home which is a major consumer of the smart grid.

The power management network 10 includes an advance metering infrastructure (AMI) smart meter 20 or an energy management system (EMS) 30 which may in real time measure electric power, supplied to each home, and electric rates.

The electric rates may be billed on the basis of an hourly rate system. Hourly electric rates may be high in a time period in which power consumption is rapidly increased, and hourly electric rates may be low in a late-night time period in which power consumption is relatively small.

The energy management system (EMS) 30 may be provided in the form of a terminal, including a screen 31 that displays a current electricity consumption state and external environments (e.g., temperature and humidity) and input buttons 32 that may be manipulated by a user.

The energy management system (EMS) 30 or the advance metering infrastructure (AMI) 20 is connected to electronic devices, such as digital television (DTV) 100, a refrigerator, a washing machine, a drying machine, an air conditioner, an illumination device, a light shading control apparatus, a dish washer, cooking equipment, a home server, and a personal computer, over a network within a home, and it may bi-directionally communicate with the electronic devices. That is, the energy management system (EMS) 30 may manage electric power consumed by the electronic devices included in the power management network 10 and supply electric power to the electronic devices. The energy management system (EMS) 30 may control the operations of the electronic devices according to circumstances. For example, the energy management system (EMS) 30 may control the on/off states of the electronic devices through the power management network 10. Meanwhile, in case where the electronic device is an air conditioner, the energy management system (EMS) 30 may control temperature, the amount of wind, the operating mode, etc. of the air conditioner.

Communication within a home may be performed in a wired or wireless way. For example, communication between the energy management system (EMS) 30 and the electronic device may be performed through wireless communication technology, such as zigbee, WiFi, or Bluetooth or may be performed through wired communication technology, such as power line communication (PLC). The electronic devices may communicate with other electronic devices.

The power management network 10 includes an auxiliary power supply 50 (that is, a self-generation facility 51, such as a solar lighting generation apparatus, and a storage battery 52 for accumulating electricity generated by the self-generation facility) provided at a home.

In addition to the storage battery 52, a fuel cell 53 may also be connected to the power management network 10, thereby being capable of serving as the auxiliary power supply.

The auxiliary power supply 50 serves to supply electric power to a home in the state in which electric power is not supplied by an external power supply, such as a power company.

The amount of electric power supplied by the auxiliary power supply or the amount of electric power charged in the auxiliary power supply 50 may be displayed in the energy management system (EMS) 30 or the advance metering infrastructure (AMI) 20.

<Configuration of Energy Management System (EMS)>

Figure 3:
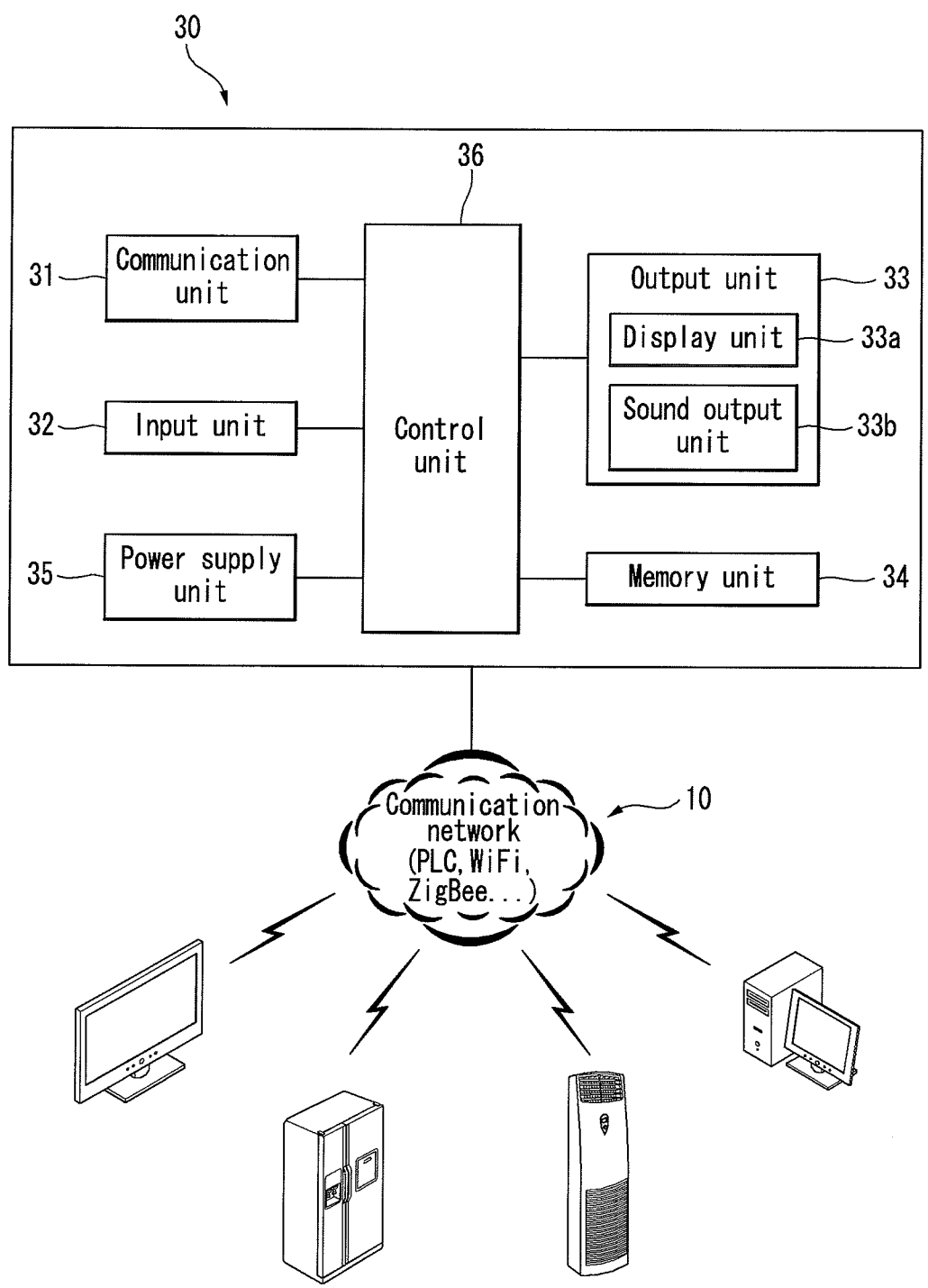
FIG. 3 is a block diagram showing an energy management system connected to the power management network according to an embodiment of the present invention.

FIG. 3 is a block diagram showing the energy management system (EMS) connected to the power management network.

The energy management system (EMS) 30 may include a communication unit 31, an input unit 32, an output unit 33, a memory unit 34, a power supply unit 35, and a control unit 36. The output unit 33 may include a display unit 33a for outputting an image and a sound output unit 33b for outputting a sound.

The communication unit 31 may send and receive data to and from electronic devices inside the power management network 10 and external devices outside the power management network 10. For example, the energy management system (EMS) 30 may receive electric power information pertinent to a smart grid including an electric rate telegraph (hereinafter referred to as 'smart grid information') from a power supplier through the communication unit 31. Further, the communication unit 31 may include one or more modules enabling communication between the DTV 100 and the network (for example, the Internet).

The communication unit 31 may receive the smart grid information by using a wire method (for example, Ethernet and PLC) or a wireless method (for example, zigbee).

For example, the communication unit 31 may receive the smart grid information by using various communication protocols, such as a wired Internet, a wireless Internet, a mobile Internet, and a mobile communication network.

A source of the smart grid information, including the electric rate information, and a method of transmitting and receiving the smart grid information may be very various.

The input unit 32 generates input data that a user controls the operation of the energy management system (EMS) 30 or data input by a user.

A method of implementing the input unit 32 is not specially limited. A keypad method, a wheel key method, a touchpad method, a touch screen method, or a method of combining two or more of the above methods may be chiefly used as the method of implementing the input unit 32. Recently, the touch screen method is chiefly used with consideration taken of increased space utilization, a need for an enlarged display screen, and a design. In this case, the input unit 32 and the display unit 33a may be integrated into one.

The output unit 33 outputs various data. The output unit 33 generates outputs pertinent to a visual sensation or an auditory sensation and may include the display unit 33a and the sound output unit 33b. The output unit 33 may further include a haptic module for generating outputs related to a tactile sensation (for example, vibration).

The memory unit 34 stores data necessary to operate the energy management system (EMS) 30. For example, the memory unit 34 may store data received through the communication unit 31 or data received through the input unit 32 or both.

The power supply unit 35 receives electric power from the external power supply or the auxiliary power supply or both and supplies power necessary for the operations of the components of the energy management system (EMS) 30. The power supply unit 35 may further include a battery, disposed within the energy management system (EMS) 30, in addition to the external power supply or the auxiliary power supply or both.

The control unit 36 generally controls the operation of the energy management system (EMS) 30. Further, the control unit 36 controls the operations of the communication unit 31, the input unit 32, the output unit 33, the memory unit 34, and the power supply unit 35.

In an embodiment of the present invention, the energy management system (EMS) 30 described above with reference to FIG. 3 performs a series of operations for controlling a variety of electronic devices (for example, a refrigerator, a washing machine, a drying machine, an air conditioner, an illumination device, a light shading control apparatus, a dish washer, cooking equipment, a home server, or a personal computer), connected to the power management network 10, on the basis of the smart grid information so that the electronic devices may consume restricted power. For example, the energy management system (EMS) 30 may perform an operation of sending a power restriction request to the electronic devices and receiving a corresponding response. A detailed method of operating the energy management system (EMS) 30 is described later.

Meanwhile, the electric power used in this specification refers to the amount of electric energy which is used per unit time, and it is assumed that the electric power includes a concept of the amount of instant electric power.

<Configuration of Electronic Device>

Figure 4:
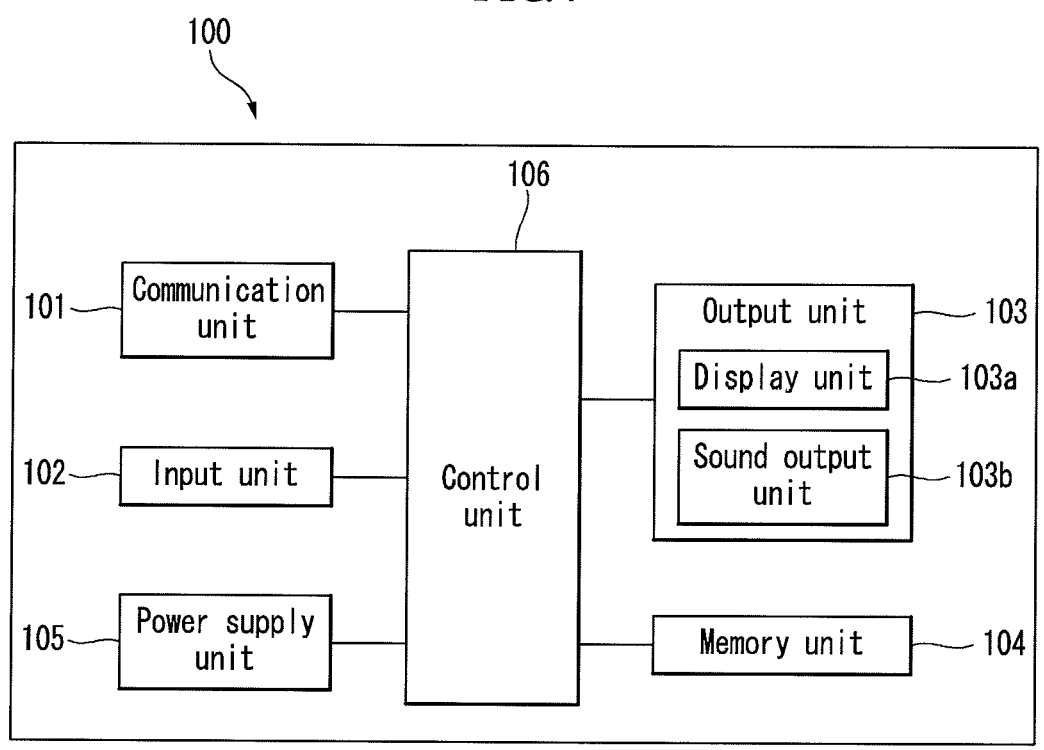
FIG. 4 is a block diagram of DTV which is one of electronic devices connected to the power management network.

FIG. 4 is a block diagram of DTV which is one of the electronic devices connected to the power management network. The DTV 100 is illustrated in FIG. 4 as an example, and the operation of the DTV 100 is chiefly described. It is, however, evident to those skilled in the art that the present invention may be applied to other electronic devices other than the DTV 100.

Referring to FIG. 4, the DTV 100 may include a communication unit 101, an input unit 102, an output unit 103, a memory unit 104, a power supply unit 105, and a control unit 106. The output unit 103 may include a display unit 103a for outputting an image and a sound output unit 103b for outputting a sound.

The communication unit 101 may send and receive data to and from the energy management system (EMS) 30 or other electronic devices, included in the power management network 10, or both over the power management network 10. Further, the communication unit 101 may communicate with external electronic devices over a network different from the power management network 10.

For example, the communication unit 101 may receive smart grid information from the energy management system (EMS) 30 or the external electronic devices by using a wire method (for example, Ethernet or PLC) or a wireless method (for example, zigbee). In other words, the communication unit 101 may receive the smart grid information by using various communication protocols, such as a wire Internet, a wireless Internet, a mobile Internet, or a mobile communication network.

The input unit 102 generates input data that a user controls the operation of the DTV 100 or data input by a user. Like the input unit 32 of the energy management system (EMS) 30, a method of implementing the input unit 102 is not specially limited. A keypad method, a wheel key method, a touchpad method, a touch screen method, or a method of combining two or more of the above methods may be used as the method of implementing the input unit 102. Moreover, the DTV 100 may receive an input signal through a remote controller, such as a space remote controller or a keypad remote controller.

The output unit 103 outputs various data. The output unit 103 generates outputs pertinent to a visual sensation or an auditory sensation and may include the display unit 103a and the sound output unit 103b. The output unit 103 may further include a haptic module for generating outputs related to a tactile sensation (for example, vibration).

The memory unit 104 stores data necessary to operate the DTV 100. For example, the memory unit 104 may store data received through the communication unit 101 or data received through the input unit 102 or both.

The power supply unit 105 receives electric power from the external power supply or the auxiliary power supply or both and supplies electric power necessary for the operations of the components of the DTV 100. The power supply unit 105 may further include a battery, disposed within the DTV 100, in addition to the external power supply or the auxiliary power supply or both.

The control unit 106 generally controls the operation of the DTV 100. Further, the control unit 106 controls the operations of the communication unit 101, the input unit 102, the output unit 103, the memory unit 104, and the power supply unit 105.

In an embodiment of the present invention, the DTV 100 described above with reference to FIG. 4 performs a series of operations for receiving information about power restriction from the energy management system (EMS) 30 and controlling the operation of the DTV 100 within the range of restricted power determined on the basis of the received information, on the basis of the smart grid information.

For example, the DTV 100 may receive a power restriction request from the energy management system (EMS) 30 and send a response to the request to the energy management system (EMS) 30 on the basis of the request and a current operation condition of the DTV 100. Further, the DTV 100 may control the operations of the components (or modules) included therein so that the components (or modules) may be properly operated within the range of operating power (i.e., restricted power) determined on the basis of the request or the current operation condition of the DTV 100 or both.

Hereinafter, the operation of an energy management system, the operations of electronic devices connected to the energy management system, and an interaction between the energy management system and the electronic devices according to an embodiment of the present invention are described in detail.

<Power Assignment Operation of Energy Management System>

Figure 5:
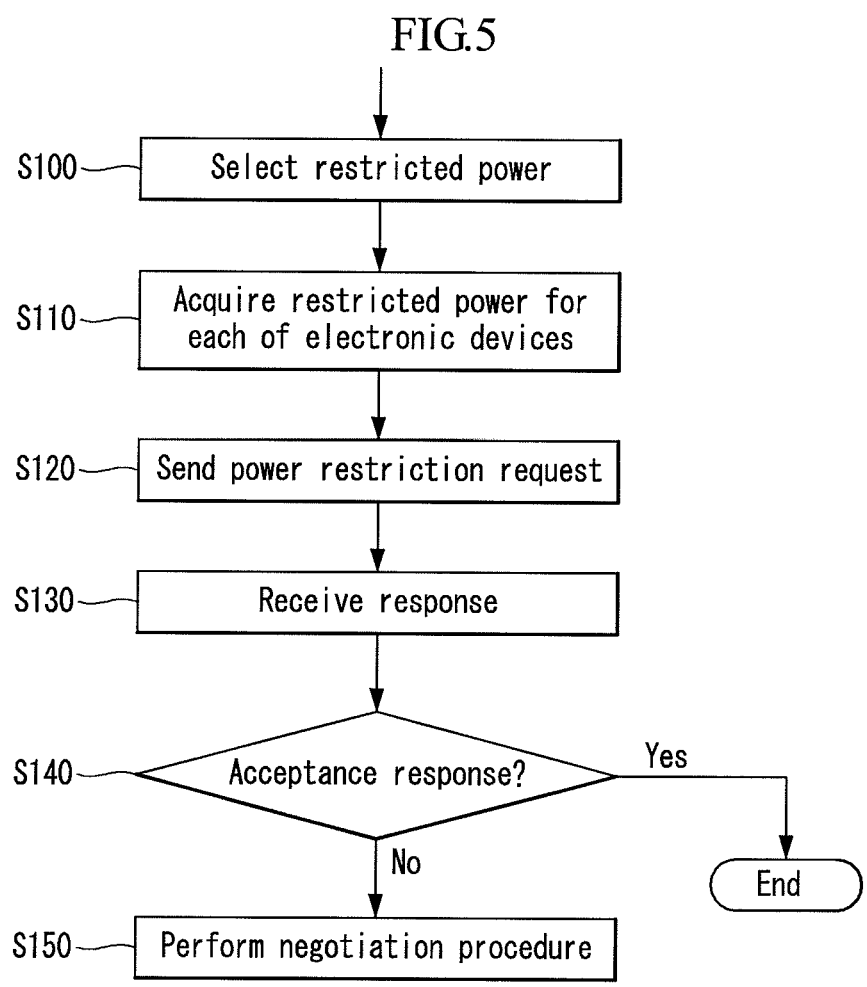
FIG. 5 is a flowchart illustrating the operation of the energy management system according to an embodiment of the present invention.

FIG. 5 is a flowchart illustrating the operation of an energy management system according to an embodiment of the present invention. Hereinafter, although an implementation of the operation of the energy management system according to the embodiment of the present invention is described on the basis of the energy management system 30 described above with reference to FIG. 3, for convenience of description, a method of operating the energy management system according to the embodiment of the present invention is not limitedly applied to the energy management system 30.

A series of operations of the energy management system assigning restricted power to each of electronic devices are described below with reference to FIG. 5.

The energy management system 30 selects the amount of restricted power that may be consumed in the power management network 10 at step S100. This means that the energy management system 30 may select a total power consumption target level. The amount of restricted power may be defined by a total power consumption target level. That is, the energy management system 30 may select a restricted power value for the total power which may be consumed by not only the energy management system 30, but also various electronic devices included in the power management network 10. For example, assuming that one power management network 10 is independently configured in each home, the amount of the restricted power may be a restriction value for the total power consumed by one home.

[Criteria for Selecting Restricted Power]

In selecting the amount of the restricted power at step S100, the energy management system 30 may automatically select the amount of the restricted power by considering various criteria and policies or user requirements or both or may select the amount of the restricted power by a user input. For example, the energy management system 30 may select the amount of the restricted power in order to reduce electric rates in a high billing period and restrict power consumption by considering smart grid information received through the communication unit 31. In some embodiments, the energy management system 30 may select the amount of the restricted power on the basis of data inputted by a user through the input unit 32. Criteria that the energy management system 30 selects the amount of the restricted power and a power restriction time are described in more detail below.

The energy management system 30 may select the amount of the restricted power by a user input. That is, the energy management system 30 may control the operations of electronic devices so that the amount of the restricted power by the user input is not exceeded. Here, the user may differently set up the amount of the restricted power according to a time zone. For example, a user may set up a great amount of restricted power in the morning time zone where power consumption is relatively great (e.g., a time zone for the preparation of breakfast and office attendance) and in the evening time zone where power consumption is relatively great (e.g., a time zone for the preparation of dinner and a time zone where TV viewing is much) and may set up a relatively small amount of restricted power in the afternoon time zone where power consumption is relatively small (e.g., members of a family have gone to work). Accordingly, the energy management system 30 may check the amount of restricted power at a current time and control the operation of each of electronic devices on the basis of the checked amount.

Meanwhile, the energy management system 30 may flexibly change the amount of restricted power every moment on the basis of predetermined electricity charges for a predetermined period. In this case, the amount of the restricted power may be changed or determined by considering electricity charge (this value may be a value determined according to a flat sum system or a value requested by a user), electricity charges to be paid so far, the predetermined period, and/or current electricity charge. For example, in case where a user has inputted and set up 5 U.S. dollars as monthly electric rates, the energy management system 30 may control the operations of electronic devices so that the electronic devices consume electric power within the electricity charges inputted by the user. More particularly, in case where a user has inputted 5 U.S. dollars as desired electric rates for only August, but electricity charges as of August 10, consumed since August 01, are 3 U.S. dollars, the energy management system 30 may determine the amount of restricted power less than that at normal times during the remaining days of August and control electronic devices on the basis of the determined amount of restricted power. On the other hand, in case where a user has inputted 5 U.S. dollars as desired electric rates for only August, but electricity charge as of August 25, consumed since August 01, are 2 U.S. dollars, the energy management system 30 may determine the amount of restricted power greater than that at normal times during the remaining days of August and control electronic devices on the basis of the determined amount of restricted power.

In addition, it is evident to those skilled in the art that an algorithm in which the energy management system 30 may select the amount of the restricted power is very various. Accordingly, those skilled in the art may change the algorithm in various ways in order to reduce the total power consumed by electronic devices belonging to a specific group.

Next, the energy management system 30 acquires a restricted device power amount to be assigned to each of electronic devices included in the power management network 10 within the range of the selected amount of the restricted power at step S110. That is, the energy management system 30 may obtain a power consumption target level for each of the electronic device. The restricted device power amount may be defined by a power consumption target level for each of the electronic device.

In acquiring the restricted power amount for each electronic device at step S110, the energy management system 30 may automatically select the restricted power amount for each electronic device with considering various criteria and policies or user requirements or both or may select restricted power by a user input.

For example, the energy management system 30 may analyze the past power usage pattern of electronic devices connected to the power management network 10, when the amount of the restricted device power is selected, and acquire the restricted device power amount for each electronic device which will be assigned to the electronic device on the basis of the analysis result.

An algorithm in which the energy management system 30 acquires the restricted power amount for each electronic device by analyzing the power usage pattern of the electronic devices may be very various. For example, a mean power value used by an electronic device in the past may be determined as the restricted power amount for the electronic device. In some embodiments, a past mean power value corresponding to the period to which a current time belongs may be determined as the restricted power amount for the electronic device. In some embodiments, the energy management system 30 may check an operation being now performed in the electronic device and determine mean power consumption, used to perform the operation in the past, as the restricted power amount for the electronic device.

In acquiring the restricted power amount for each electronic device, the energy management system 30 may further perform an operation of identifying electronic devices currently consuming electric power (for example, electronic devices that are being turned on), from among electronic devices connected to the power management network 10.

The energy management system 30 may further perform an operation of checking whether there is an electronic device that is now turned off, but has to perform a scheduled operation in the time period to which the amount of the restricted power is applied. Here, the energy management system 30 may acquire the restricted power amount for each electronic device with consideration taken of a restricted power amount to be assigned to an electronic device which must perform a scheduled operation.

Next, the energy management system 30 sends a power restriction request, including the acquired restricted device power amount, to a corresponding electronic device at step S120. The power restriction request may be sent in the form of a message. The power restriction request may be written in the XML-based text format.

The power restriction request is to request that the corresponding electronic device be operated under restricted power. The electronic device which has received the power restriction request may determine operating power on which the electronic device will be operated with reference to the restricted power amount in the power restriction request. If the operating power is determined, the electronic device must be operated within the range of the determined operating power, unless special circumstances occur.

In response to the power restriction request, the electronic device sends a response to the energy management system 30 by taking the restricted power amount, included in the power restriction request, into consideration. A detailed operation of the electronic device according to the reception of the power restriction request is described later.

The energy management system 30 receives the response from the electronic device which has received the power restriction request at step S130. The response may include an acceptance response and a rejection response. The acceptance response and the rejection response are described in detail later.

Next, the energy management system 30 determines whether the response is the acceptance response or the rejection response at step S140.

If, as a result of the determination, the response is the acceptance response, the energy management system 30 terminates the restricted power assignment operation with the electronic device. It does not mean that all the operations of the energy management system 30 are terminated. In case where restricted power assignment operation with other electronic devices is not terminated, the energy management system 30 may continue to perform the restricted power assignment operation with other electronic devices.

However, if, as a result of the determination, the response is the rejection response, the energy management system 30 performs a series of negotiation procedures for assigning restricted power to the electronic device at step S150. The negotiation procedures performed by the energy management system 30 are described in detail later.

Although the energy management system 30 is illustrated to send the power restriction request to one electronic device, the energy management system 30 may send the power restriction request to a plurality of electronic devices connected to the power management network 10, as described above. The transmission of the power restriction request from the energy management system 30 to the plurality of electronic devices may be performed in a bundle or sequentially. For example, the energy management system 30 may determine a restricted power amount for each electronic device with respect to a plurality of electronic devices and then send the power restriction request to the electronic devices at a time. In some embodiments, in case where a restricted power amount for one electronic device is determined, the energy management system 30 may first send a power restriction request to the one electronic device without waiting for the determination of a restricted power amount for each of other electronic devices.

The power assignment operation of the energy management system according to the embodiment of the present invention has been described above. An operation of an electronic device being operated according to a restricted power amount assigned thereto according to an embodiment of the present invention is described below.

Power Assignment Operation of Electronic Device>

How each electronic device is operated according to a series of operations of the energy management system assigning restricted module power (hereinafter, may be referred as 'restricted power') to each of electronic devices is described below with reference to FIG. 6.

Figure 6:
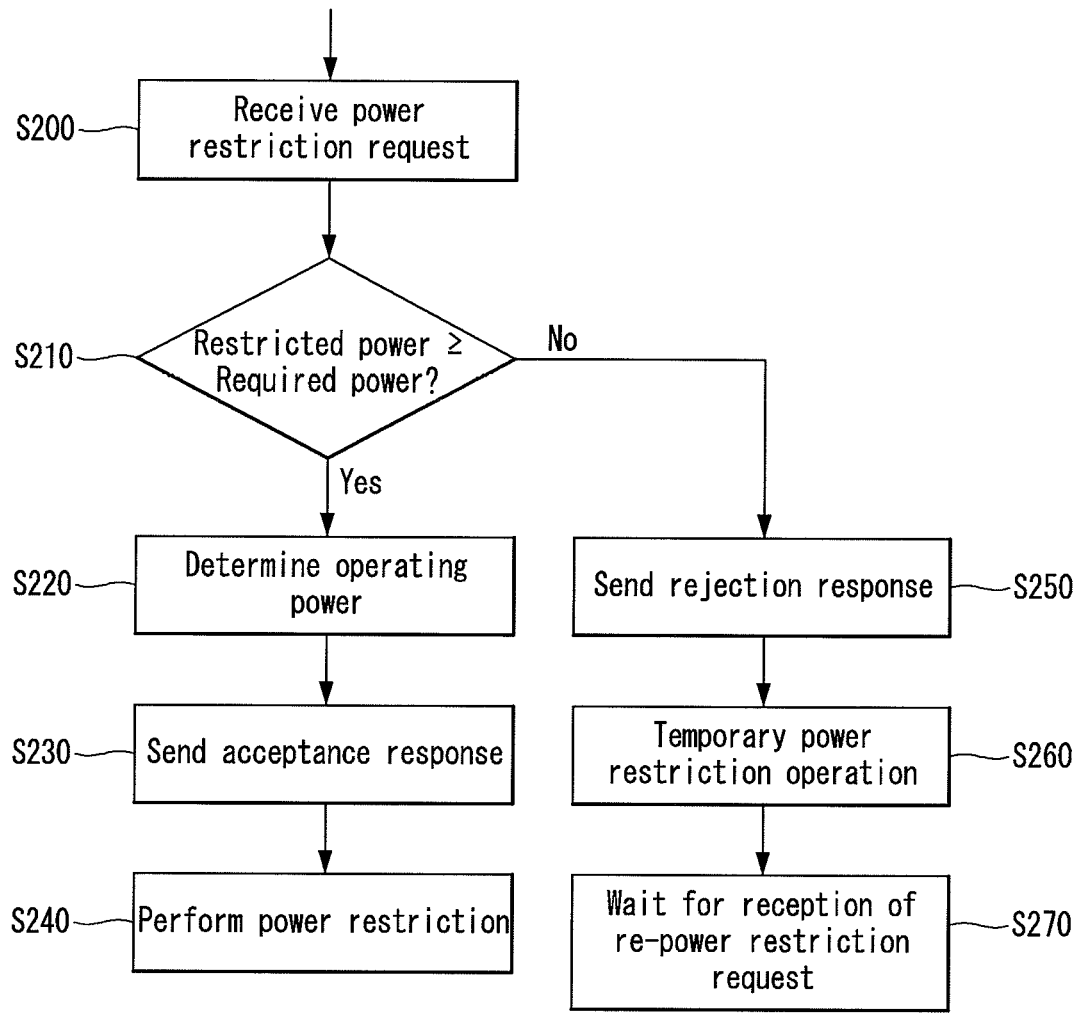
FIG. 6 is a flowchart illustrating a method of operating an electronic device according to an embodiment of the present invention.

FIG. 6 is a flowchart illustrating a method of operating an electronic device according to an embodiment of the present invention. Although an implementation of the operation of the electronic device according to the embodiment of the present invention is described below in connection with the DTV 100 with reference to FIG. 4, for convenience of description, the method of operating the electronic device according to the embodiment of the present invention is not limited to the DTV 100, but may be applied to other electronic devices.

The DTV 100 receives a power restriction request from the energy management system 30 according to the above-described step S120, at step S200.

The DTV 100 compares a restricted power amount, included in the power restriction request, and required power necessary for its current condition at step S210.

The restricted power amount for the DTV 100 is a restricted power amount assigned to the DTV 100, as described above.

The required power refers to power consumption necessary for the operation of the DTV 100. Meanwhile, the operation of comparing the restricted power amount and the required power corresponds to an operation performed by the DTV 100 in order to select an 'operating power'. In this specification, the required power and the operating power have different concepts.

The required power may be determined by various criteria. The various criteria are described in more detail below.

[Determining Required Power]

In case where the DTV 100 is performing a predetermined operation at the request of a user, the control unit 106, or the energy management system 30, the required power may be determined as electric power consumed to perform the requested operation.

For example, in case where the DTV 100 is displaying a 'movie A'? through the display unit 103*a* at the request of a user, if power consumption necessary to display the 'movie A'? is X, the DTV 100 may determine the required power as X.

Meanwhile, the required power may be determined as electric power consumed to perform an operating mode set up in the DTV 100 at the request of a user, the control unit 106, or the energy management system 30.

For example, in case where the DTV 100 is outputting 'Music B'? through the sound output unit 103*b* under the control of the energy management system 30 and is set up in a 'Maximum power-saving mode'? at the request of a user and operating, if power consumption necessary to output 'Music B'? is Y and a value set to electric power consumed to operate the 'Maximum power-saving mode'? is Z (where Z is assumed to be greater than Y), the DTV 100 may determine the required power as Z. In this case, assuming that an algorithm in which the DTV 100 determines required power gives the order of priority to required power consumed to operate the operating mode, the required power is determined as Z. Accordingly, if an algorithm in which the DTV 100 determines required power is different from the above, the DTV 100 may determine the required power as Y.

The operation of the DTV 100 is described below with reference to FIG. 6. If, as a result of the comparison at step S210, the restricted power amount is the required power or higher, the step S220 is performed. If, as a result of the comparison at step S210, the restricted power amount is less than the required power, step S250 is performed.

First, a case where the restricted power amount is the required power or higher is described below.

If the restricted power amount is the required power or higher, the DTV 100 determines its own operating power at step S220. The operating power is determined on the basis of the restricted power amount and the required power. When the operating power is determined, the DTV 100 must be operated within the range of the determined operating power, unless special circumstances occur. In other words, the DTV 100 must control the operation of each of the components (or modules), constituting the DTV 100, so that electric power consumed by the components does not exceed the determined operating power.

[Determining Operating Power]

If the restricted power for the DTV 100 is the required power or higher, the DTV 100 may determine the operating power on the basis of various criteria.

First, the DTV 100 may determine the operating power having the same value as the restricted power amount. In case where current required power is less than a restricted power amount, but electric power greater than the current required power is expected to be required in the future, the DTV 100 may make the decision. In some embodiments, in case where current required power is less than a restricted power amount, but an operation request made by a user is determined to be irregular or an operation execution request made by a user is determined to be frequent, the DTV 100 may make the decision in order to secure redundant power necessary to perform an additional operation requested by the user.

For example, assuming that the restricted power amount is A and power necessary for an operation (for example, the display of 'AAB News' of the DTV 100 is B (B<A), in case where a current operation is terminated and the execution of another operation (for example, the display and recording of 'Movie D' is scheduled by a user, if electric power necessary to execute another operation is C greater than B, the DTV 100 may determine the operating power as A in order to secure electric power necessary to perform the scheduled operation.

Second, the DTV 100 may determine the operating power to have the same value as the required power. In case where more electric power than current electric power is not expected to be consumed in the future, the DTV 100 may make such decision.

Third, the DTV 100 may determine the operating power as one value between the required power and a restricted power amount assigned to the DTV 100. For example, in the above example, in case where the electric power C necessary to perform the scheduled operation is greater than the electric power B necessary for the current operation being executed, but less than the restricted power amount A, the DTV 100 may determine the required power as C (where C is less than the restricted power amount A, but greater than the current electric power B). In addition, the DTV 100 may determine the operating power as one value between the required power and the restricted power amount in various ways by taking some conditions and the past power consumption pattern into consideration.

In case where the restricted power amount is the required power or higher, the DTV 100 sends a response to the power restriction request at step S230. In this case, the response sent by the DTV 100 is an acceptance response. The acceptance response may perform a function of informing the energy management system 30 that the DTV 100 has determined operating power in response to the power restriction request.

The acceptance response may include required power or operating power determined by the DTV 100. In case where the required power and the operating power are included in the acceptance response and transmitted, the energy management system 30 may use the required power and the operating power when subsequently performing a negotiation procedure with other electronic devices in a process of assigning a restricted power amount to each electronic device. This is described in detail later.

Next, the DTV 100 performs a power restriction operation on the basis of the determined operating power so that electric power consumed by the operation of the DTV 100 does not exceed the determined operating power at step S240. For controlling the power restriction operation, the DTV 100 may control at least one of a current value and a voltage value.

A case in which the restricted power for the DTV 100 is less than the required power is described below.

If, as a result of the comparison at step S210, the restricted power amount is less than the required power, the DTV 100 sends a response to the power restriction request at step S250. In this case, the response is a rejection response. The rejection response may perform a function of informing the energy management system 30 that the DTV 100 has rejected the power restriction request.

The rejection response may include the required power determined by the DTV 100. The rejection response may further include the order of priority given to an operation which is being performed by the DTV 100. In case where the required power or the order of priority is included in the rejection response and transmitted, the energy management system 30 may use the required power or the order of priority when performing a series of processes for subsequently reassigning a restricted power amount to the DTV 100.

In case where the rejection response is transmitted, the DTV 100 temporarily performs a power restriction operation at step S260. For example, the DTV 100 may determine the determined required power as the operating power and control its own operation on the basis of the operating power. In other words, the operation of the DTV 100 may be temporarily controlled so that the DTV 100 does not use electric power higher than current electric power that is now being used.

Furthermore, the DTV 100 may wait for until a re-power restriction request is received from the energy management system 30 at step S270. When the re-power restriction request is received, the DTV 100 may return to the step S210 and perform a series of the operations again.

<Negotiation Procedure>

According to the embodiment of the present invention, the operation of the energy management system 30 restricting electric power, consumed by each of electronic devices, by sending a power restriction request to each of the electronic devices has been described above. If all the electronic devices accept the power restriction request, the power assignment procedure may be smoothly completed, but some of the electronic devices may reject the power restriction request as described above. A negotiation procedure for assigning electric power to some of electronic devices in case where some of the electronic devices reject a power restriction request is described below.

Figure 7:
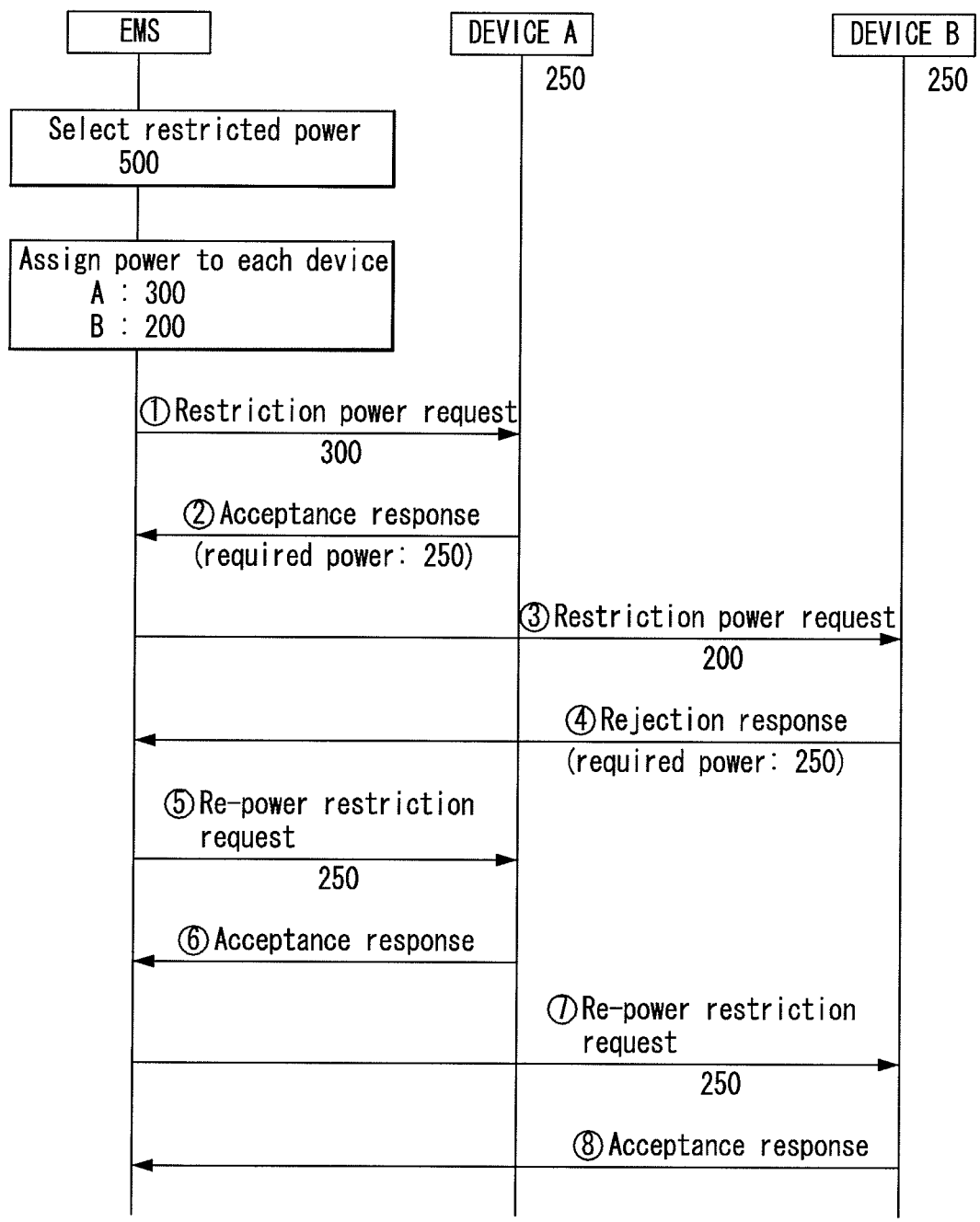
FIG. 7 is a diagram illustrating a negotiation procedure performed according to an embodiment of the present invention.

FIG. 7 is a diagram illustrating a negotiation procedure performed according to an embodiment of the present invention.

FIG. 7 shows a case where the energy management system (EMS) has selected 500 as the restricted power amount at step S100 and acquired 300 and 200 for a first electronic device DEVICE A and a second electronic device DEVICE B, respectively at step S110. Furthermore, FIG. 7 shows that the first electronic device DEVICE A has determined his own required power as 250 and the second electronic device DEVICE B has determined his own required power as 250, on the basis of the above-described predetermined criteria.

In this case, first, the energy management system (EMS) may send a power restriction request, including 300 (i.e., a restriction value determined for the first electronic device DEVICE A), to the first electronic device DEVICE A. In response thereto, the first electronic device DEVICE A may send an acceptance response to the energy management system (EMS) as described above. This is because the assignment value for the first electronic device DEVICE A is greater than the required power value 200 determined by the first electronic device DEVICE A. In this case, the energy management system (EMS) may consider that the assignment of the restricted power amount to the first electronic device DEVICE A is successful. Here, the acceptance response may include the required power determined by the first electronic device DEVICE A.

Next, the energy management system (EMS) may send a power restriction request, including 200 (i.e., a restriction value determined for the second electronic device DEVICE B), to the second electronic device DEVICE B. It is not required that the energy management system ESM send a power restriction request to the second electronic device DEVICE B after receiving the response from the first electronic device DEVICE A. The transmission of the power restriction request to the first electronic device DEVICE A and the second electronic device DEVICE B and the reception of the responses therefrom may be performed in parallel. In response to the power restriction request, the second electronic device DEVICE B may send a rejection response to the energy management system (EMS), as described above. This is because the assignment value for the second electronic device DEVICE B is less than the required power value 250 determined by the second electronic device DEVICE B. In this case, the energy management system (EMS) may consider that the assignment of the restricted power amount to the second electronic device DEVICE B is unsuccessful. Here, the rejection response may include the required power determined by the second electronic device DEVICE B. The rejection response may further include the order of priority given to one or more of operations which are being performed in the second electronic device DEVICE B.

In case where the rejection response is received in response to the power restriction request as described above, the energy management system (EMS) may secure redundant power in order to further assign the shortage 50 to the second electronic device DEVICE B or, in case where the redundant power is not secured, may control the second electronic device DEVICE B so that the second electronic device DEVICE B is operated according to the restriction value for the second electronic device DEVICE B by stopping a current operation or degrading the quality of a current operation.

The energy management system (EMS) may check whether the redundant power to be assigned to the second electronic device DEVICE B may be secured. In order to check whether the redundant power may be secured, the energy management system (EMS) may refer to the required power included in the acceptance response. For example, the energy management system (EMS) may know that the redundant power 50 may be secured from the first electronic device DEVICE A with reference to the restriction value assigned to the first electronic device DEVICE A and the required power received from the first electronic device DEVICE A.

The energy management system (EMS) may send a power restriction request to the first electronic device DEVICE A again. Here, the restriction value for the first electronic device DEVICE A, included in the power restriction request, may be 250. In other words, when assigning electric power to the first electronic device DEVICE A again, the energy management system (EMS) may request the first electronic device DEVICE A to determine the required power, received from the first electronic device DEVICE A, as the restriction value for the first electronic device DEVICE A. Next, the energy management system (EMS) may receive an acceptance response from the first electronic device DEVICE A, unless special circumstances occur (for example, a case where required power has bee abruptly increased after a previous acceptance response). Accordingly, the energy management system (EMS) may secure the redundant power to be assigned to the second electronic device DEVICE B.

In order to assign electric power to the second electronic device DEVICE B again, the energy management system (EMS) may send a power restriction request to the second electronic device DEVICE B. Here, a restriction value for the second electronic device DEVICE B, included in the power restriction request, may be 250 which has risen from the existing restriction value 200 and to which the redundant power 50 secured from the first electronic device DEVICE A during the above process has been added. Accordingly, the energy management system (EMS) may receive an acceptance response from the second electronic device DEVICE B.

Meanwhile, when the energy management system (EMS) first assigns the restriction value 300 for the first electronic device DEVICE A to the first electronic device DEVICE A, the first electronic device DEVICE A may determine operating power as 250 (i.e., the required power) and send the determined operating power, together with the acceptance response, as described above. In this case, if a rejection response is received from the second electronic device DEVICE B, the energy management system (EMS) may immediately perform a power re-assignment procedure for the second electronic device DEVICE B without performing a power re-assignment procedure for the first electronic device DEVICE A. This is because the energy management system (EMS) has already known that the redundant power 50 has been secured in virtue of the active operation of the first electronic device DEVICE A.

It has been described that the energy management system (EMS) uses required power for each electronic device, included in an acceptance response, in order to determine whether redundant power may be secured. However, in case where redundant power needs to be secured, the energy management system (EMS) may send a message, requesting a plurality of electronic devices included in the power management network 10 to response to required power actually being used in the electronic device, to the electronic devices. Here, the message may be sent in a broadcasting manner.

Although the execution of the negotiation procedure according to the embodiment of the present invention has been described above with reference to FIG. 7 assuming that the number of electronic devices is 2, those skilled in the art will appreciate that redundant power may be secured by using a method similar to the above negotiation procedure in case where the number of electronic devices is three or more.

Furthermore, the negotiation procedure according to the embodiment of the present invention, described above with reference to FIG. 7, may be performed in case where electric power that may be applied to one electronic device is insufficient. A trigger to perform the negotiation procedure is not limited thereto. That is, it is not required that the negotiation procedure be performed only in case where one electronic device sends a rejection response in response to a power restriction request.

For example, the negotiation procedure may be performed in case where a new electronic device joins the power management network 10 and electric power has to be assigned to the new electronic device. Moreover, the energy management system (EMS) may perform the negotiation procedure in case where an electronic device to which electric power has already been assigned requests the assignment of more electric power because a special circumstance has occurred.

<Power Assignment Procedure in Case where Negotiation Procedure is Unsuccessful>

There may be a case where a negotiation procedure has been performed between the energy management system and electronic devices, but redundant power to be sufficiently assigned to an electronic device which has sent a rejection response is not secured. In other words, there may be a case where a negotiation procedure has been performed, but results in a failure.

In this case, the energy management system 30 may perform the following forced assignment procedure.

First, the energy management system 30 may query a user about the order of priority of power assigned to each electronic device.

FIG. 8 is a diagram showing a user interface in which the energy management system queries a user about the order of priority. Referring to FIG. 8, the energy management system 30 displays a window W1 displaying a list of electronic devices now being operated or expected to be operated in the future, along with a sentence requesting a user to determine and input the order of priority, on the display unit 33a. The window W1 matches a list of electronic devices with current operation kinds or scheduled operation kinds of the electronic devices and brief descriptions of the operations thereof. The user may select the importance of each operation with reference to the information about the electronic devices and operations thereof, while seeing the window W1.

The user interface of the energy management system 30, provided to the user so that the user may select the importance of an operation through the energy management system 30, may be very various.

For example, the user interface may be provided to the user so that the user may sequentially select the order of priorities of the operations.

In some embodiments, there may be provided a user interface in which a user may input which priority order will be assigned to each operation, from among predetermined priority orders. That is, a user may input the order of priority per operation by inputting the order of priority so that each operation belongs to a specific priority order, from among the order of priorities classified into the first priority to the fourth priority. A description corresponding to each priority order may be provided to the corresponding priority order. For example, a description, such as 'an operation that must now be performed and not allowed for degradation of the quality' may be provided to the first priority, a description, such as 'an operation that must now be performed and allowed for degradation of the quality' may be provided to the second priority, a description, such as 'an operation that needs not to be performed now, but needs to be operated again subsequently' may be provided to the third priority, and a description, such as 'an operation that needs not to be performed now, but also needs not to be operated again subsequently' may be provided to the fourth priority. It is to be noted that the classification of the priorities is not limited thereto, but may be changed in various ways.

The energy management system 30 may request degradation of the quality in an operation, the stop of the operation, or both from each of electronic devices in relation to some of operations being operated in the electronic device with consideration taken of selected or inputted importance (or the order of priority) through the window W1 or the user interface or both. Redundant power obtained because of degradation of the quality in the operation, the stop of the operation, or both may be used as a restricted power amount for each electronic device, requested in the above negotiation procedure.

An algorithm in which the energy management system 30 will degrade which operation (or an operation of which electronic device) and degrade the operation to what extent if the operation is degraded, or will stop which operation may be very various.

If the energy management system 30 degrades the operation quality of each electronic device or stops the operation of its own accord even though it is operated on the basis of importance inputted or selected by a user, unexpected inconvenience may lead to the user. For example, there may be a case where, during the time for which a user watches a movie through the DTV 100, the screen size of the movie or the volume of the movie, displayed in the DTV 100, is greatly reduced in response to an operation degradation request made by the energy management system 30. In this case, the user may feel inconvenience.

For the above reason, it would be more convenient to a user if the energy management system 30 allows the user to select an operation allowed to stop operating in each electronic device, rather than to select importance or the order of priority for an operation in each electronic device.

FIG. 9 is a diagram showing a user interface in which the energy management system queries a user about an electronic device to be stopped. Referring to FIG. 9, the energy management system 30 displays a window W2 displaying a list of electronic devices now being operated or expected to be operated in the future, along with a sentence requesting a user to input an operation to be stopped, on the display unit 33a. Furthermore, information about redundant power that must be secured now may be provided to a user. The window W2 matches a list of electronic devices with current operation kinds or scheduled operation kinds of the electronic devices and brief descriptions of the operations thereof. The user may select the importance of each operation with reference to the information about the electronic devices and operations thereof, while seeing the window W1. Further, the window W2 may display electric power consumed by each operation. In some embodiments, in case where an operation to be stopped is selected, a check box for receiving a choice about whether the stopped operation will be restarted when redundant power is subsequently secured may be further provided in the window W2. A user may select an operation to be stopped in the window W2 with reference to various electronic devices, power consumption information about the electronic devices, and information about redundant power to be secured.

The user interface of the energy management system 30, provided to a user, so that the user may select the importance of an operation through the energy management system 30 may be very various.

In the embodiments described with reference to FIGS. 8 and 9, the energy management system 30 is illustrated to display all pieces of information. However, the present invention is not limited to the above embodiments in which all the pieces of information are displayed in the energy management system 30. For example, the pieces of information may be displayed through the DTV 100 connected to the power management network 10. In some embodiments, the pieces of information may be displayed through a general-purpose computer connected to the power management network 10. Accordingly, a user may receive and input information through a more convenient user interface with a larger screen. It is also to be noted that the present invention is not limited to the display of the pieces of information, and the pieces of information may be output as a sound.

The process of assigning the restricted power amount for each electronic device, selected by the energy management system 30 and assigned to the power management network 10, to each of the electronic devices through an interaction between the energy management system 30 and the electronic devices has been described above.

Hereinafter, in accordance with an embodiment of the present invention, how an electronic device is operated within the range of a restricted power amount assigned thereto (that is, how the power restriction operation is performed) is described in detail.

Power Restriction Operation of Electronic Device

First Embodiment

Figure 10:
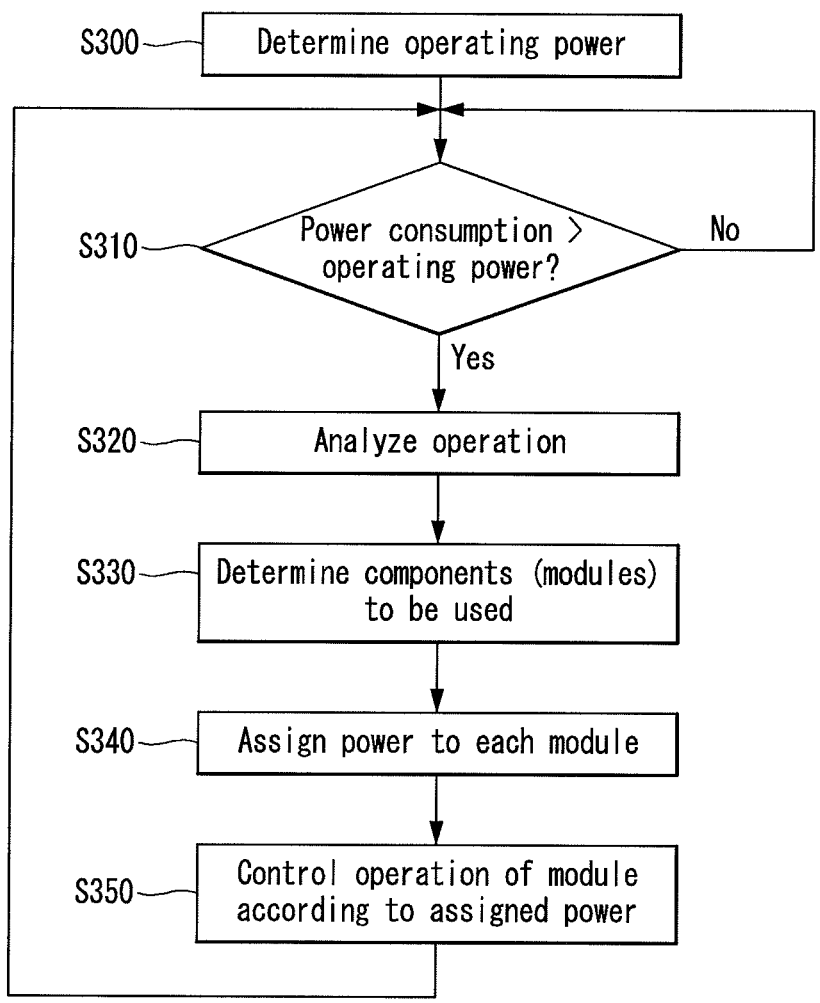
FIG. 10 is a flowchart illustrating a method of an electronic device performing a power restriction operation according to a first embodiment of the present invention.

FIG. 10 is a flowchart illustrating a method of an electronic device performing the power restriction operation according to the first embodiment of the present invention. An implementation of the power restriction operation according to an embodiment of the present invention is described below in connection with the DTV 100 described with reference to FIG. 4, for convenience of description, but the method of the electronic device performing the power restriction operation according to the embodiment of the present invention is not limited to the DTV 100.

According to the first embodiment, the DTV 100 controls its own operation so that it does not exceed the total operating power. The DTV 100 continues to check power consumption. If the power consumption exceeds the operating power while checking, the DTV 100 may expect the amount of power for each component (or a module) consumed to perform an operation, assign the expected amount of power to the component, and degrade the performance of its own operation on the basis of the amount of power assigned thereto.

Referring to FIG. 10, the DTV 100 determines operating power as described above at step S300.

The DTV 100 determines whether its own power consumption exceeds the determined operating power, while checking the power consumption, at step S310. The checking operation of the DTV 100 may be performed in real time or may be performed periodically.

If, as a result of the determination, the power consumption exceeds the operating power during the checking operation, the DTV 100 analyzes an operation that is being performed or that has been requested to be performed at step S320. For example, the DTV 100 may determine whether the operation is to watch video contents such as a stored movie, to watch video contents such as TV broadcasting, to record video contents, to listen to sound contents such as music received through a broadcasting signal, or to perform Internet browsing.

The DTV 100 determines components (or modules) necessary for the operation on the basis of the analyzed result at step S330. For example, in case where the operation is to watch stored video contents, the DTV 100 may determine that the memory unit 104, the output unit 103, the input unit 102, and the control unit 106 are components necessary for the operation. For another example, in case where the operation is to output sound contents through a broadcasting signal, the DTV 100 may determine that the communication unit 101, the sound output unit 103*b*, the input unit 102 and the control unit 106 are components necessary for the operation.

The DTV 100 assigns the expected amount of power to each of the determined components at step S340. For example, the DTV 100 may assign the expected amount of power to the component, used to perform the analyzed operation, by analyzing the past power consumption pattern of the component.

In case where the power supply unit 105 of the DTV 100 includes a battery, the DTV 100 may control the operating power so that the operating power is not assigned to the battery. That is, the DTV 100 may control the operating power so that the operating power is not consumed to charge the battery. If a requested operation is to charge the battery, the DTV 100 may control the operating power so that the operating power is consumed to only charge the battery.

The DTV 100 may properly assign the expected amount of power to each of the components and control the component so that the component is operated within the range of the power assigned thereto at step S350. Since the expected amount of power is assigned to the component as described above, the performance of the operation of the component may be degraded. For example, in case where contents are displayed through the display unit 103*a*, assuming that electric power of 500 is consumed in the case of a normal and common operation, the DTV 100 may assign electric power of 400 (i.e., electric power for each component) to the display unit 103*a*. In this case, the display unit 103*a* may reduce electric power consumed by itself by reducing the brightness or size of the contents displayed in the display unit 103*a*.

The DTV 100 may check the electric power consumed by itself in real time, while performing the above-described power restriction operation. That is, the DTV 100 may continue to perform the step 310. In other words, the DTV 100 continues to check power consumption in real time. If the power consumption exceeds the operating power while checking, the DTV 100 analyzes the operation, determines the amount of power to be assigned to each component on the basis of the analyzed operation, and assigns the determined amount of power to the corresponding component. As described above, the DTV 100 may control a requested operation so that the requested operation is performed within the range of the operating power assigned thereto. That is, the DTV 100 may dynamically control electric power assigned to each component according to circumstances in response to the requested operation.

Second Embodiment

According to the second embodiment, the DTV 100 may assign the determined operating power to components (or modules) per component and control the components so that each of the components is operated only within the range of the amount of power assigned thereto.

Figure 11:
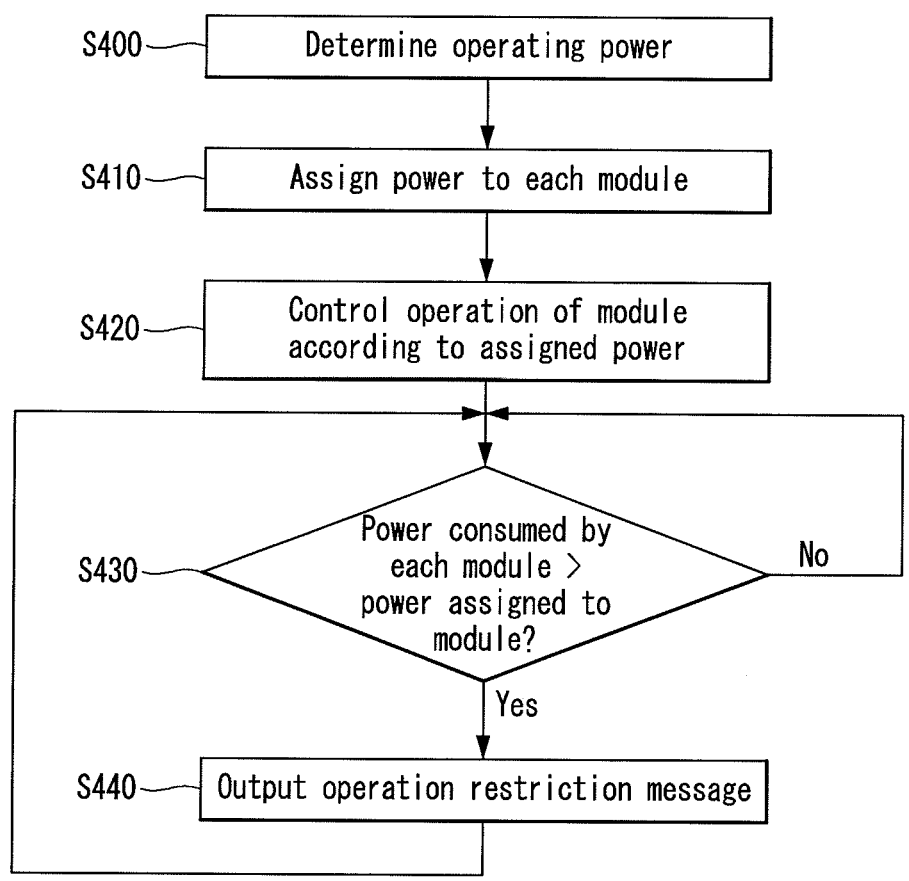
FIG. 11 is a flowchart illustrating a method of an electronic device performing a power restriction operation according to a second embodiment of the present invention.

FIG. 11 is a flowchart illustrating a method of an electronic device performing a power restriction operation according to the second embodiment of the present invention.

Referring to FIG. 11, the DTV 100 determines operating power at step S400, as described above.

The DTV 100 determines the amount of power to be assigned to each of the components (or modules) within the range of the determined operating power and assigns the determined amount of power to the corresponding component at step S410.

The DTV 100 may determine the amount of power for the component by analyzing the past power consumption pattern of the component.

In some embodiments, the DTV 100 may determine amount of power to be assigned to the component on the basis of an operating mode set up in the DTV 100. A variety of operating modes may be set up in the DTV 100. For example, the operating mode may include a maximum power-saving mode, a movie watching mode, a music listening mode, an Internet mode, a battery charge mode, and an optimum operating mode. The operating mode is not limited to the above modes, and operating modes inherent in each electronic device may also exist. A table in which the amounts of power for components are matched with respective components in relation to each operating mode may be stored in the memory unit 104 of the DTV 100. An example of the table is shown in FIG. 12.

From FIG. 12, it may be seen that the total power consumption is assigned to the DTV 100 on the basis of each of the operating modes set up in the DTV 100 and the total power consumption is also assigned to each of the components on a mode basis. That is, the amount of power for each component is matched with each of the operating modes. The amount of power for each component may be assigned by taking the characteristic of the operating mode into consideration. In case where the power supply unit 105 includes a battery, the amount of power assigned to the power supply unit 105 refers to the amount of power assigned to charge the battery.

From FIG. 12, it may be seen that in the case of a movie watching mode, a maximum power is assigned to the display unit 103*a* and the sound output unit 103*b*. It may also be seen that in the case of a music listening mode, a maximum power is assigned to the sound output unit 103*b*, but only power of 10 is assigned to the display unit 103*a* because there is no problem in music listening even though the display unit 103*a* is turned off. It is to be noted that the above examples are only illustrative. For example, in the case of the music listening mode, there is no problem even though the amount of power assigned to the display unit 103*a* is 0. Furthermore, it may be seen that in the case of a stored contents watching mode, only power of 10 is assigned to the communication unit 101 because the contents are not received through a broadcasting signal, but power of 90 is assigned to the memory unit 104. It may also be seen that in the case of a broadcasting contents watching mode, power of 10 is assigned to the memory unit 104, but power of 90 is assigned to the communication unit 101.

Meanwhile, in case where the power supply unit 105 of the DTV 100 does not include a battery, the DTV 100 may control the operating power so that the operating power is not assigned to the battery. In other words, the DTV 100 may control the operating power so that the operating power is not consumed to charge the battery. From FIG. 12, it may be seen that in the case of the second power-saving mode and the maximum power-saving mode, the operating power is not consumed to charge a battery because the amount of power assigned to the power supply unit 105 is 0.

As may be seen from FIG. 12, in case where the setup operating mode is a battery charge mode, the DTV 100 may control the operating power so that the operating power is consumed to only charge the battery. From FIG. 12, it may be seen that power of 100 is assigned to the power supply unit 105, but no power is assigned to the remaining components.

Meanwhile, the numeral values indicated in FIG. 12 are not actual values, but arbitrary values, for convenience of description. It is to be noted that there is no technical meaning given to the illustrated numeral values.

Referring back to FIG. 11, the DTV 100 controls each of the components so that the component is operated within the range of the amount of power, determined and assigned thereto at step S410, at step S420.

Next, the DTV 100 checks whether the amount of power consumed by the component exceeds the amount of power assigned to the component at step S430. The checking operation includes not only an operation of checking only the amount of power actually consumed by the component, but also an operation of checking expected power consumption which is necessary to perform a requested operation from a user or the energy management system 30. For example, in case where a user requests a 'rewind? operation' for video contents, the DTV 100 may determine whether the amount of power, expected to be consumed by at least one of the memory unit 104, the control unit 106, and the display unit 103a in performing the 'rewind? operation', will exceed the amount of power assigned to at least one of the memory unit 104, the control unit 106, and the display unit 103a. The checking operation of the DTV 100 needs not to be necessarily performed in real time, but may be performed only when a new operation request is received from the outside.

If the amount of power consumed by one of the components exceeds the amount of power assigned to the corresponding component during the checking operation, the DTV 100 may output a message, informing that the corresponding operation is restricted according to a power restriction operation, at step S440.

For example, in the process of assigning the amount of power to each component, it is assumed that the amount of power assigned to the sound output unit 103b is 100. Here, in case where a 'Volume-Up? operation' for increasing the sound volume is requested by a user and the volume of sound output is increased in response to a requested value, if the amount of power expected to be consumed by the sound output unit 103b is 100, the DTV 100 may output a message, informing that the sound cannot be output in response to the volume requested by the user. That is, the DTV 100 may not perform the requested operation.

Figure 13:
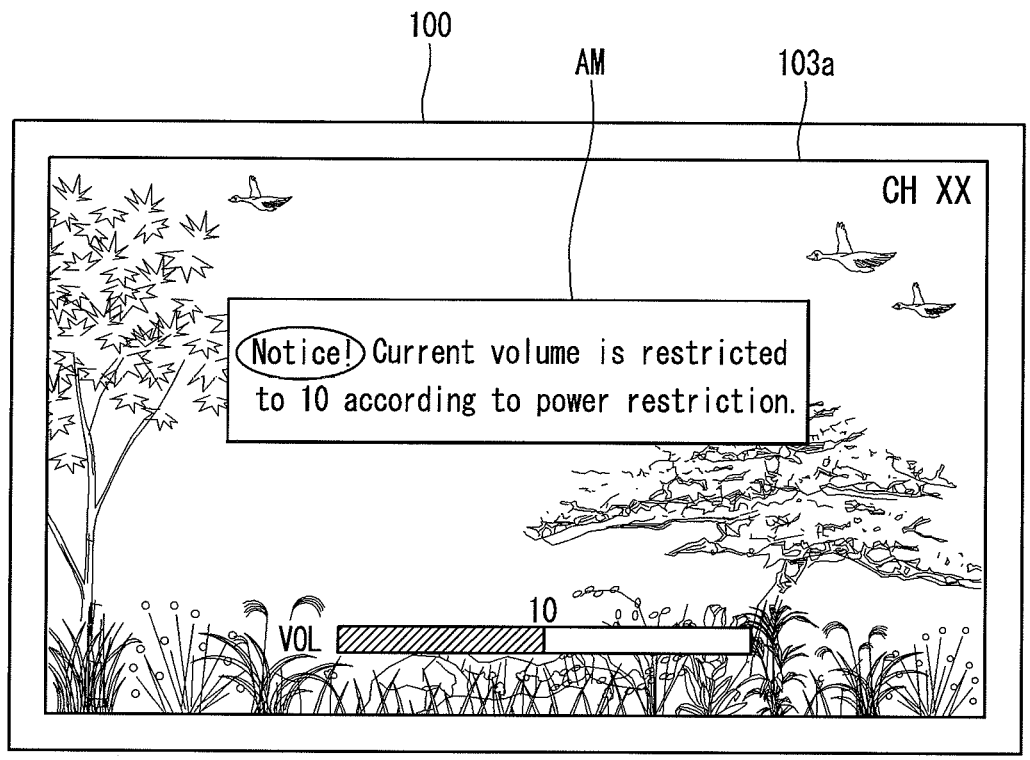
FIG. 13 is a diagram showing that an operating restriction message is displayed to a user according to a power restriction operation performed by an electronic device according to an embodiment of the present invention.

FIG. 13 is a diagram showing that an operating restriction message is displayed to a user according to the power restriction operation performed by an electronic device as described above. Referring to FIG. 13, in case where a user requests that the volume be increased by using a remote controller RC, the DTV 100 may inform the user of a volume value restricted by the amount of power assigned to the sound output unit 103b and display an alarming message AM, informing that the operation of increasing the volume higher than the volume value cannot be performed. Even in the case in which other operation is requested in addition to the operation of increasing the volume, if the operation consumes the amount of power higher than the amount of power assigned to each component (or module), the DTV 100 may display the message to a user in a similar way, thus informing the user that the power restriction operation is being performed.

While performing the above power restriction operation, the DTV 100 may assign the amount of power to each component and control the component so that the component is operated within the range of the assigned amount of power. The DTV 100 first assigns the amount of power to each component within an operating power irrespective of a requested operation and, if power consumption exceeding the amount of power assigned to the component is generated or expected to be generated, the operation of the DTV 100 is restricted. It is therefore not necessary to continuously check power consumption consumed by the DTV 100 in real time.

[Reassignment Request]

In case where an electronic device including the DTV 100 determines that it cannot perform a requested operation within the range of the operating power while performing the above power restriction operation, the electronic device may request the reassignment of power from the energy management system 30.

Hereinafter, an operation of the electronic device requesting the assignment of power from the energy management system 30 is described in detail.

Figure 14:
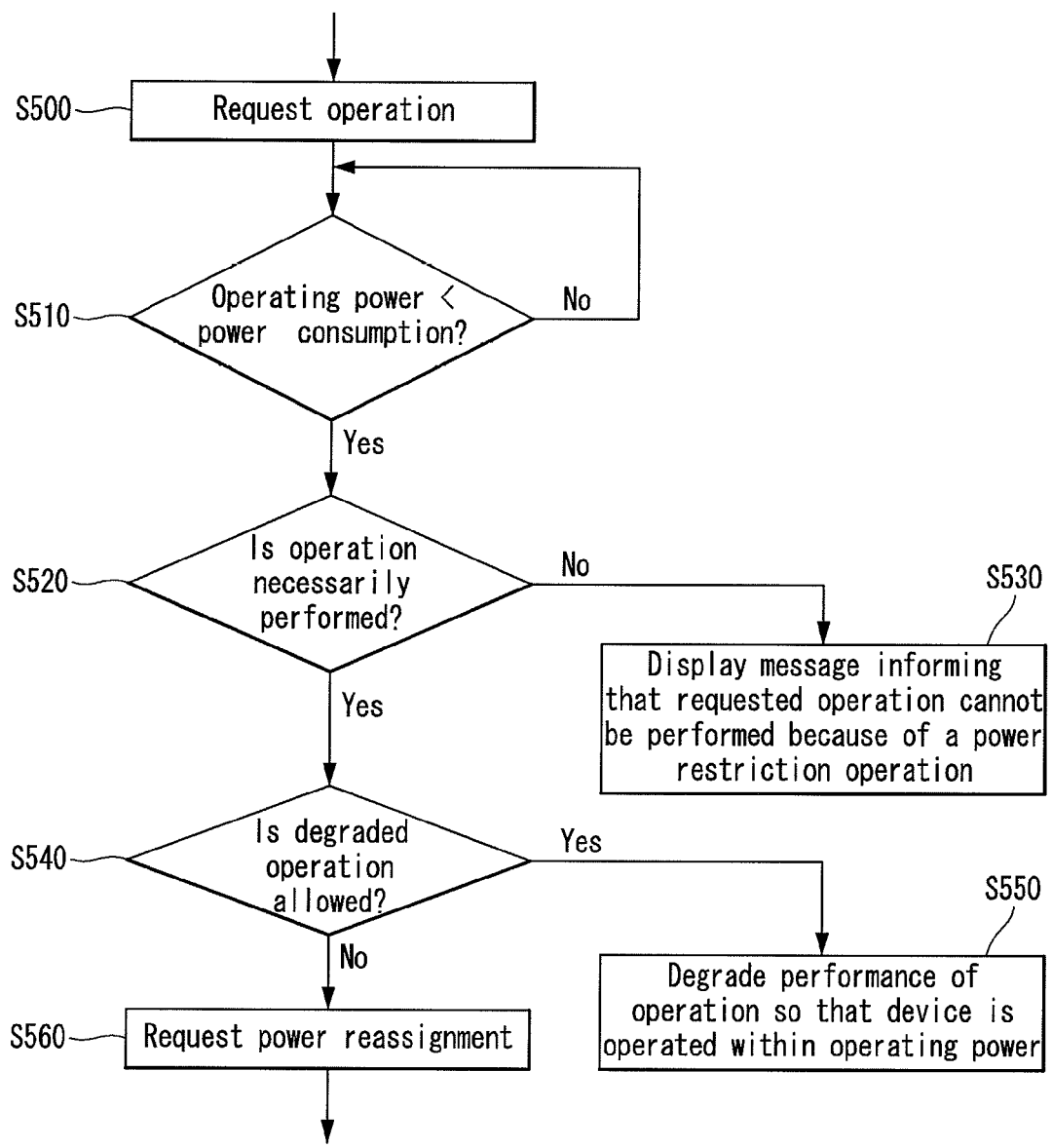
FIG. 14 is a flowchart illustrating a process of an electronic device requesting the reassignment of power according to an embodiment of the present invention.

FIG. 14 is a flowchart illustrating a process of an electronic device requesting the reassignment of power according to an embodiment of the present invention. Referring to FIG. 14, the DTV 100 receives a request for a predetermined operation from a user or an external device including the energy management system 30, at step S500.

The DTV 100, as described above, may check whether the requested operation is executed within the range of the determined operating power at step S510. In other words, the DTV 100 determines whether power consumed by the requested operation exceeds the operating power at step S510.

If, as a result of the determination, the power consumption is determined to exceed the operating power, the DTV 100 may query the user about whether the requested operation must be performed at step S520. The DTV 100 may receive a response thereto from the user.

If, as a result of the query at step S520, the requested operation is determined not to be necessarily performed, the DTV 100 may output a message, informing that the requested operation cannot be performed according to a power restriction operation, through the output unit 103 at step S530. At the same time, the DTV 100 may disregard the requested operation and monitor the power restriction operation again.

However, if, as a result of the query at step S520, the requested operation is determined to be necessarily performed, the DTV 100 may query the user about whether the performance of the requested operation is allowed to be degraded at step S540. The DTV 100 may receive a response thereto from the user.

If, as a result of the query at step S540, the performance of the requested operation is determined to be allowed to be degraded, the DTV 100 performs the requested operation on the basis of degraded performance at step S550. For example, in case where watching video contents has been requested through the DTV 100, the DTV 100 may output the video contents, but output the video contents with a reduced brightness, size, or sound volume.

However, if, as a result of the query at step S540, the performance of the requested operation is determined not to be allowed to be degraded, the DTV 100 requests the energy management system 30 to reassign the amount of power thereto at step S560. That is, the DTV 100 determines that the requested operation must be performed and requests the energy management system 30 to reassign the amount of power necessary to perform the requested operation.

In order to request the reassignment of power, the DTV 100 may send a power reassignment request to the energy management system 30. The power reassignment request may include the amount of power consumed to perform the requested operation. The power reassignment request may further include information about the order of priority given to the requested operation.

In response to the power reassignment request, the energy management system 30 may secure redundant power by performing the above negotiation procedure on the basis of the amount of power necessary to perform the requested operation or the information about the order of priority or both. Next, the energy management system 30 may send a power assignment request to the DTV 100 and reassign the secured redundant power to the DTV 100.

As described above, the DTV 100 is operated on the basis of the power assignment operation and the power restriction operation thereof.

The power restriction operation of an electronic device may be performed in various ways according to the type of the electronic device. Accordingly, how the power restriction operation according to the present invention may be applied to various electronic devices is described in detail below.

Figure 15:
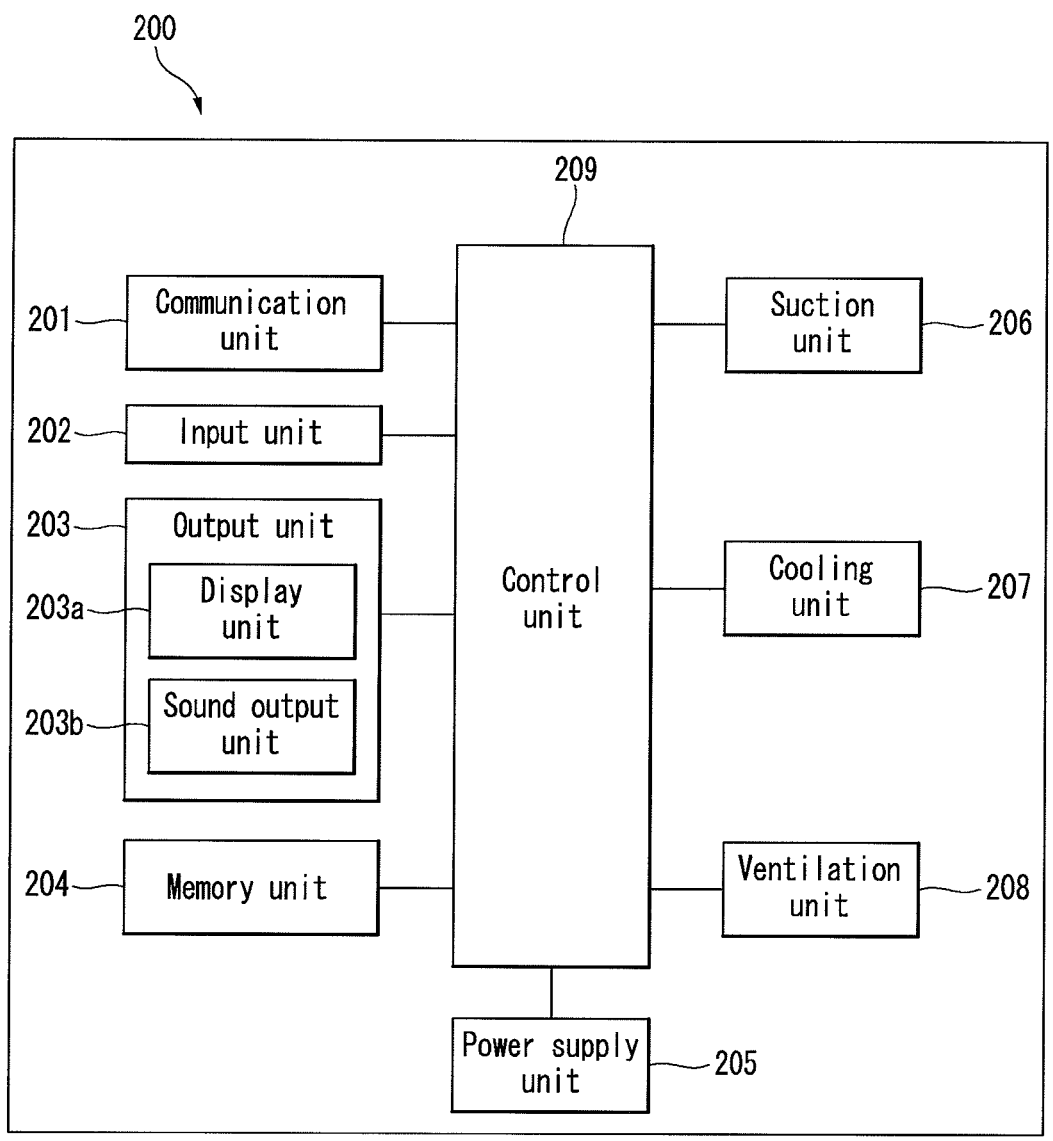
FIG. 15 is a simplified block diagram showing the configuration of an air conditioner according to an embodiment of the present invention.

FIG. 15 is a simplified block diagram showing the configuration of an air conditioner according to an embodiment of the present invention.

Referring to FIG. 15, the air conditioner 200 may include a communication unit 201, an input unit 202, an output unit 203, memory unit 204, a power supply unit 205, a suction unit 206, a cooling unit 207, a ventilation unit 208, and a control unit 209. The output unit 203 may include a display unit 203a for outputting an image and a sound output unit 203b for outputting a sound.

The communication unit 201, the input unit 202, the output unit 203, the memory unit 204, and the power supply unit 205 of the air conditioner 200 perform the same or similar function as the communication unit 101, the input unit 102, the output unit 103, the memory unit 104, and the power supply unit 105 of the DTV 100, respectively, and a detailed description thereof is omitted.

The suction unit 206 sucks air around the air conditioner 200 into the air conditioner 200.

The cooling unit 207 cools the air sucked through the suction unit 206.

The ventilation unit 208 discharges the sucked air outside the air conditioner 200.

The control unit 209 generally controls the operation of the air conditioner 200.

The first embodiment described with reference to FIG. 10 may also be applied to the air conditioner 200.

The air conditioner 200 may determine operating power at step S300. The air conditioner 200 may determine whether its own power consumption exceeds the determined operating power, while checking the power consumption, at step S310.

If, as a result of the determination, the power consumption is determined to exceed the determined operating power, the air conditioner 200 may analyze an operation that is being performed or that has been requested to be performed at step S320 and determine components (or modules) necessary for the operation on the basis of the analyzed result at step S330. For example, the air conditioner 200 may determine whether the operation is air cooling or ventilation and, if, as a result of the determination, the operation is air cooling, check a set temperature. If, as a result of the check, the operation is ventilation, the air conditioner 200 may determine that the suction unit 206 and the ventilation unit 208 are indispensable components without the need to operate the cooling unit 207.

The air conditioner 200 may properly assign the operating power to the determined components per component and control the components so that each of the components is operated within the range of the amount of power assigned thereto at step S350. As the amount of power is assigned to the component, the performance of the operation of the component may be degraded. For example, the performance of the operation of the cooling unit 207 may be degraded because the amount of power assigned to the cooling unit 207 is restricted.

Meanwhile, the second embodiment described above with reference to FIG. 11 may also be applied to the air conditioner 200.

More particularly, the air conditioner 200 may determine operating power at step S400, determine the amount of power to be assigned to each of the components (or modules) within the range of the determined operating power, and assign the determined amount of power to the corresponding component at step S410. The air conditioner 200 may determine the amount of power for the component on the basis of the past power consumption pattern of the component. Like the DTV 100, the air conditioner 200 may determine the amount of power for the component on the basis of an operating mode set up in the air conditioner 200.

FIG. 16 is a diagram showing a table in which various operating modes that may be set up in the air conditioner are matched with the amounts of electric power assigned to the respective components according to an embodiment of the present invention. The amounts of power for the respective components may be assigned by taking the characteristics of the operating modes into consideration. The numeral values indicated in the table of FIG. 16 are not actual values, but arbitrary values, for convenience of description. It is to be noted that there is no technical meaning given to the illustrated numeral values.

From FIG. 16, it may be seen that the amount of power, assigned to each of the suction unit 206, the cooling unit 207, and the ventilation unit 208 in the rapid air-cooling mode, is higher than that in the common air-cooling mode, and no power is assigned to the cooling unit 207 in the ventilation mode not requiring air cooling.

The air conditioner 200 controls the components so that each of the components is operated within the range of the amount of power, determined and assigned thereto, at step S420 and checks whether the amount of power consumed by the component exceeds the amount of power assigned to the component at step S430.

If, as a result of the determination, the amount of power consumed by one of the components is determined to exceed the amount of power assigned to the corresponding component during the checking operation, the air conditioner 200 may output a message, informing that the operation of the component is restricted according to a power restriction operation at step S440.

Hereinafter, an example in which the first and second embodiments of the present invention are applied to a refrigerator is described.

Figure 17:
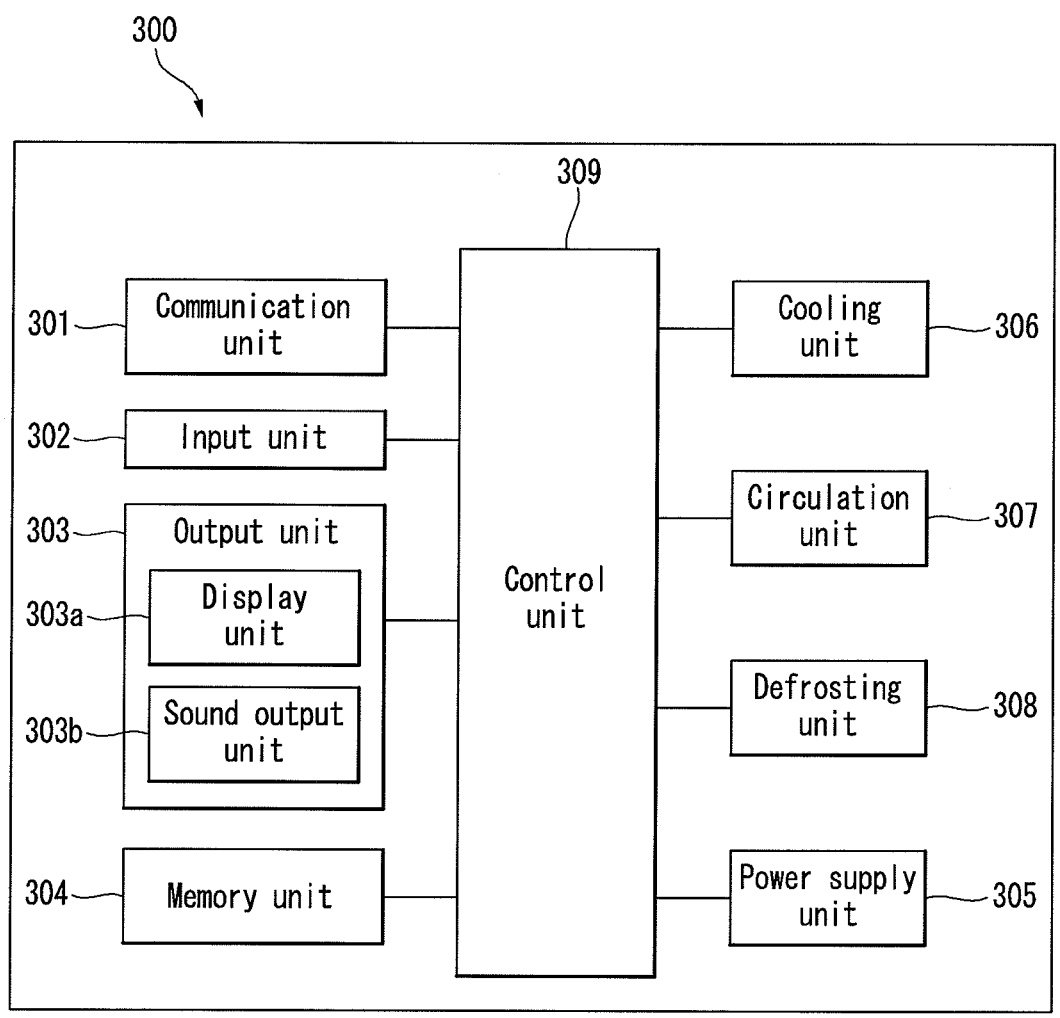
FIG. 17 is a simplified block diagram showing the configuration of a refrigerator according to an embodiment of the present invention.

FIG. 17 is a simplified block diagram showing the configuration of the refrigerator according to an embodiment of the present invention.

Referring to FIG. 17, the refrigerator 300 may include a communication unit 301, an input unit 302, an output unit 303, a memory unit 304, a power supply unit 305, a cooling unit 306, a circulation unit 307, a defrosting unit 308, and a control unit 309. The output unit 203 may include a display unit 203a for outputting an image and a sound output unit 203b for outputting a sound.

The communication unit 301, the input unit 302, the output unit 303, the memory unit 304, and the power supply unit 305 of the refrigerator 300 perform the same or similar function as the communication unit 101, the input unit 102, the output unit 103, the memory unit 104, and the power supply unit 105 of the DTV 100 described above, respectively, and a detailed description thereof is omitted.

The cooling unit 306 functions to lower temperature of a refrigerant in order to maintain temperature within the cool chamber or the freezer or both of the refrigerator 300 at low temperature.

The circulation unit 307 functions to control temperature within the refrigerator at an adequate level by circulating a refrigerant, cooled by the cooling unit 306, within the refrigerator 300.

The defrosting unit 30 functions to remove frost which may occur within the refrigerator 300. For example, the defrosting unit 30 may include a hot wire installed in the inner wall of the refrigerator 30.

The control unit 309 generally controls the operation of the refrigerator 300. Furthermore, the control unit 307 controls the operations of the communication unit 301, the input unit 302, the output unit 303, the memory unit 304, the power supply unit 305, the cooling unit 306, the circulation unit 307, and the defrosting unit 308.

The first embodiment described with reference to FIG. 10 may be applied to the refrigerator 300.

The refrigerator 300 may determine operating power at step S300 and determine whether its own power consumption exceeds the determined operating power, while checking the power consumption, at step S310.

If, as a result of the determination, the power consumption is determined to exceed the operating power during the checking operation, the refrigerator 300 may analyze an operation that is being performed or that has been requested to be performed at step S320. The refrigerator 300 may determine components (or modules) necessary for the operation on the basis of the analyzed result at step S330. For example, the refrigerator 300 may check a set temperature or determine whether a supercooling operation is performed or whether a defrosting operation is performed and then may determine components necessary for the operation on the basis of the analysis result.

The refrigerator 300 may properly assign the operating power to the determined components per component and control the components so that each of the components is operated within the range of the amount of power assigned to the corresponding component at step S350. As the amount of power is assigned to the component, the performance of the operation of the component may be degraded. For example, in case where a requested operation is a defrosting operation, the amount of power assigned to the defrosting unit 308 is restricted. Accordingly, assuming that the time taken to remove frost is about 30 minutes, 30 minutes or more may be taken to remove frost because the performance of the operation of the defrosting unit 308 is degraded.

Meanwhile, the second embodiment described above with reference to FIG. 11 may also be applied to the refrigerator 300.

More particularly, the refrigerator 300 may determine operating power at step S400, determine the amount of power to be assigned to each of the components within the range of the determined operating power, and assign the determined amount of power to the corresponding component at step S410. Like the DTV 100, the refrigerator 300 may determine the amount of power for each component on the basis of the past power consumption pattern of the component and an operating mode set up in the refrigerator 300, as described above.

FIG. 18 is a diagram showing a table in which various operating modes that may be set up in the refrigerator are matched with the amounts of power assigned to the respective components according to an embodiment of the present invention. The supercooling mode of FIG. 18 refers to a mode where the freezer is supercooled in a specific time period (for example, a low billing period in electric rates) and temperature within the cool chamber is maintained by using the supercooled air of the freezer in other time periods (for example, a high billing period in electric rates). During the time for which the supercooled air is used, the supply of power to the cooling unit 306 may be stopped or minimized. The supercooling mode A of FIG. 18 refers to an operating mode where supercooling is performed, and the supercooling mode B thereof refers to an operating mode where temperature within the cool chamber is maintained by using the supercooled air.

From FIG. 18, it may be seen that in a quick freezing mode, a lot of power is assigned to the cooling unit 306 and the circulation unit 307 because a refrigerant has to be quickly cooled and, at the same time, a cooled refrigerant has to be quickly circulated. It may also be seen that in the supercooling mode A, a lot of power is assigned to the cooling unit 307 and in the supercooling mode B, the amount of power assigned to the cooling unit 307 becomes a minimum. In particular, it may be seen that power assigned to other components (that is, the communication unit 301, the input unit 302, the output unit 303, and the defrosting unit 308) in the supercooling mode B (corresponding to the high billing period) is less than power in other modes.

The refrigerator 300 controls the components so that each of the components is operated within the range of the amount of power, determined and assigned thereto, at step S420 and checks whether the amount of power consumed by the component exceeds the amount of power assigned to the component at step S430.

If, as a result of the check, the amount of power consumed by one of the components is determined to exceed the amount of power assigned to the corresponding component while checking, the refrigerator 300 may output a message, informing that the operation of the component is restricted according to a power restriction operation at step S440.

An example in which the first embodiment and the second embodiment of the present invention are applied to a personal computer (hereinafter referred to as an 'RC') is described below.

Figure 19:
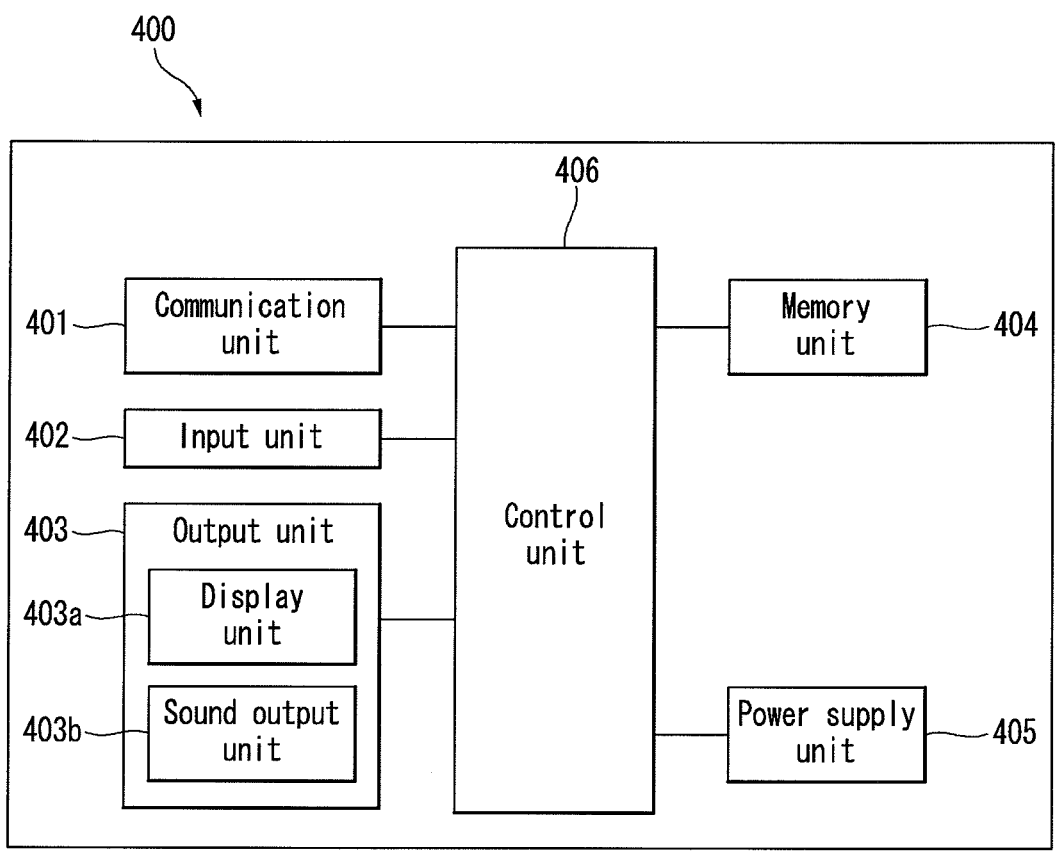
FIG. 19 is a simplified block diagram showing the configuration of a personal computer (PC) according to an embodiment of the present invention.

FIG. 19 is a simplified block diagram showing the configuration of a PC according to an embodiment of the present invention.

Referring to FIG. 19, the PC 400 may include a communication unit 401, an input unit 402, an output unit 403, a memory unit 404, a power supply unit 405, and a control unit 406. The output unit 403 may include a display unit 403a for outputting an image and a sound output unit 403b for outputting a sound.

The communication unit 401, the input unit 402, the output unit 403, the memory unit 404, and the power supply unit 405 of the PC 400 perform the same or similar function as the communication unit 101, the input unit 102, the output unit 103, the memory unit 104, and the power supply unit 105 of the DTV 100, respectively, and a detailed description thereof is omitted. Here, the communication unit 401, the input unit 402, the output unit 403, and the memory unit 404 of the PC 400 may be constructed of additional components attachable to or detachable from the PC 400.

The control unit 406 generally controls the operation of the PC 400. Further, the control unit 406 controls the operations of the communication unit 401, the input unit 402, the output unit 403, the memory unit 404, and the power supply unit 405.

The first embodiment described above with reference to FIG. 10 may be applied to the PC 400.

The PC 400 may determine operating power at step S300 and determine whether its own power consumption exceeds the determined operating power, while checking the power consumption, at step S310.

If, as a result of the determination, the power consumption is determined to exceed the operating power during the checking operation, the PC 400 may analyze an operation that is being performed or that has been requested to be performed at step S320 and determine components (or modules) necessary for the operation on the basis of the analyzed result at step S330. For example, the PC 400 may determine whether communication is being performed over a network, such as the Internet, and determine components necessary for the operation on the basis of the analysis result.

The PC 400 may properly assign the operating power to the determined components per component and control the components so that each of the components is operated within the range of the amount of power assigned thereto at step S350. As the amount of power is assigned to the component, the performance of the operation of the component may be degraded. For example, in case where the power of the display unit 403a is restricted, the brightness of the display unit 403a or the size of a region where information is displayed in the display unit 403a may be reduced (for example, the information is displayed in half the screen). For another example, in case where the amount of power assigned to the control unit 406 is restricted, the operating speed of the control unit 406 may be slowed down. For example, in case where the control unit 406 is constructed of hardware, such as a CPU, the number of operating clocks of the CPU may be reduced.

Meanwhile, the second embodiment described above with reference to FIG. 11 may be applied to the PC 400.

More particularly, the PC 400 may determine operating power at step S400. The PC 400 may determine the amount of power to be assigned to each of the components (or modules) within the range of the determined operating power and assign the determined amount of power to the corresponding component at step S410. The PC 400 may determine the amount of power for each component on the basis of the past power consumption pattern of the component. Like the DTV 100, the PC 400 may determine the amount of power for each component on the basis of operating modes set up in the PC 400.

FIG. 20 is a diagram showing a table in which various operating modes that may be set up in the PC are matched with the amounts of electric power assigned to the respective components according to an embodiment of the present invention.

From FIG. 20, it may be seen that in the case of an optimum performance mode, a maximum power is assigned to each of the components so that the component may exhibit the optimum performance. It may also be seen that in the case of an Internet mode, the amount of power assigned to the communication unit 401 is the same as that of the optimum performance mode, but electric power assigned to each of the input unit 402, the output unit 403, etc. has been reduced because a communication function is important. Furthermore, it may be seen that in the case of a multimedia mode, multimedia, such as a movie, music, or a game, has to be output and thus the amount of power assigned to the output unit 403 is maintained to a maximum, but electric power assigned to each of the communication unit 401, the input unit 402, and the control unit 406, not significantly related to the output of the multimedia, has been reduced as compared with the optimum performance mode. It may also be seen that in the case of a document task mode, power assigned to most of the components has been reduced, as compared with the optimum performance mode, because the performance of most of the components needs not to be maintained to a maximum.

Meanwhile, the PC 400 may control the components so that each of the components is operated within the range of the amount of power, determined and assigned thereto, at step S420 and determine whether the amount of power consumed by the component exceeds the amount of power assigned to the component at step S430.

If, as a result of the determination, the amount of power consumed by one of the components is determined to exceed the amount of power assigned to the component during the determination operation, the PC 400 may output a message, informing that the operation of the component is restricted according to a power restriction operation at step S440.

Meanwhile, in case where the power supply unit 405 of the PC 400 includes a battery, the amount of power assigned to the power supply unit 405 may refer to the amount of power assigned to charge the battery. Here, the PC 400 may control the operating power so that the operating power is not assigned to the battery. In other words, the PC 400 may control the operating power so that the operating power is not consumed to charge the battery. From FIG. 20, it may be seen that in the case of the second power-saving mode and the maximum power-saving mode, the operating power is not consumed to charge the battery because the amount of power assigned to the power supply unit 405 is 0.

From FIG. 20, it may also be seen that in case where a setup operating mode is the battery charge mode, the PC 400 may control the operating power so that the operating power is consumed to only charge the battery. In other words, power of 100 may be assigned to the power supply unit 405, and no power may be assigned to the remaining components.

The various embodiments described in this document may be implemented within a medium which may be read by a computer or a similar device by using, for example, software, hardware, or a combination of them.

According to hardware implementations, the embodiments described in this document may be implemented by using at least one of Application Specific Integrated Circuits (ASICs), Digital Signal Processors (DSPs), Digital Signal Processing Devices (DSPD), Programmable Logic Devices (PLDs), Field Programmable Gate Arrays (FPGAs), processors, controllers, microprocessors, and an electronic unit designed to perform a function.

According to software implementations, the embodiments, such as procedures or functions, may be implemented along with a separate software module configured to perform at least one function or operation. Software codes may be implemented by using a software application written in a proper program language. Further, the software codes may be stored in the memory unit and executed by the control unit.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A consumer electronic device, comprising:
   a communication unit configured to communicate with a power management apparatus controlling a power management network within a building or within one or more rooms of a building; and a control unit operatively connected to the communication unit, the control unit configured to:
  determine a required power level necessary for operation of the consumer electronic device,
  receive, from the power management apparatus, a first power restriction command including a first power consumption target level determined by the power management apparatus to be equal to or less than a total power consumption target level of the power management network,
  compare the required power level and the first power consumption target level to produce a comparison result,
  transmit, to the power management apparatus, a response to the first power restriction command according to the comparison result,
  wherein the response comprises:
    an acceptance response when the first power consumption target level is equal to or higher than the required power level, and
    a rejection response requesting for a power consumption target level higher than the first power consumption target level when the first power consumption target level is lower than the required power level, and
  control power consumption of the first consumer electronic device based on the first power restriction command after transmitting the acceptance response.

2. The consumer electronic device of claim 1, wherein the response further comprises one of:
  a request for a power consumption target level lower than the first power consumption target level,
  a current power consumption level of the first consumer electronic device, and
  a difference between the current power consumption level and the first power consumption target level.

3. The consumer electronic device of claim 1, wherein the control unit is configured to
  receive, from the power management apparatus, a second power restriction command including a second power consumption target level different from the first power consumption target level,
  transmit, to the power management apparatus, a second response to the second power restriction command, and
  control power consumption of the first consumer electronic device based on the second power consumption target level.

4. The consumer electronic device of claim 3, wherein the second power consumption target level is based on one of a change in the total power consumption target level for the power management network and a change in a power consumption of a second consumer electronic device connected to the power management network.

5. The consumer electronic device of claim 1, wherein the first device power consumption target level is based on a power consumption pattern of the first consumer electronic device and the required power of the first consumer electronic device.

6. The consumer electronic device of claim 1, wherein the first power consumption target level is based on a current or projected power consumption need of a second consumer electronic device connected to the power management network.

7. The consumer electronic device of claim 1, wherein the consumer electronic device is a digital television.

8. The consumer electronic device of claim 1, wherein the control unit is configured to control the power consumption of the first consumer electronic device by controlling power consumption of one or more specific modules within the consumer electronic device.

9. The consumer electronic device of claim 8, wherein the control unit is configured to vary the power consumption of the one or more specific modules within the consumer electronic device in response to a user action while maintaining compliance with the first power restriction command.

10. The consumer electronic device of claim 9, wherein the control unit is configured to vary the power consumption of the one or more specific modules by varying at least one of an output characteristic and an operating speed of the one or more specific modules.

11. The consumer electronic device of claim 1, wherein the control unit is configured to variably assign all or part of the first power consumption target level to one or more specific modules within the consumer electronic device based on a user command.

12. The consumer electronic device of claim 1, wherein the control unit is configured to output a message indicating that a requested operation is unable to be performed, if power consumption necessary for the requested operation violates the first power restriction command.

13. A method of controlling a first consumer electronic device, the method comprising:
  determining a required power level necessary for operation of the first consumer electronic device,
  receiving, from a power management apparatus controlling a power management network within a building or within one or more rooms of a building, a first power restriction command including a first power consumption target level determined by the power management apparatus to be equal to or less than a total power consumption target level of the power management network,
  comparing the required power level and the first power consumption target level to produce a comparison result,
  transmitting, to the power management apparatus, a response to the first power restriction command according to the comparison result,
  wherein the response comprises:
    an acceptance response when the first power consumption target level is equal to or higher than the required power level, and
    a rejection response requesting for a power consumption target level higher than the first power consumption target level when the first power consumption target level is lower than the required power level, and
  controlling power consumption of the first consumer electronic device based on the first power restriction command after transmitting the acceptance response.

14. The method of claim 13, wherein the response further comprises one of:
  a request for a power consumption target level lower than the first power consumption target level,
  a current power consumption level of the first consumer electronic device, and
  a difference between the current power consumption level and the first power consumption target level.

15. The method of claim 13, further comprising:
  receiving, from the power management apparatus, a second power restriction command including a second power consumption target level different from the first power consumption target level;
  transmitting, to the power management apparatus, a second response to the second power restriction command; and controlling power consumption of the first consumer electronic device based on the second power consumption target level.

16. The method of claim 15, wherein the second power consumption target level is based on one of a change in the total power consumption target level for the power management network and a change in a power consumption of a second consumer electronic device connected to the power management network.

17. The method of claim 13, wherein the first device power consumption target level is based on a power consumption pattern of the first consumer electronic device and the required power of the first consumer electronic device.

18. The method of claim 13, wherein the first power consumption target level is based on a current or projected power consumption need of a second consumer electronic device connected to the power management network.

19. The method of claim 13, wherein the first consumer electronic device is a digital television.

20. The method of claim 13, wherein the step of controlling the power consumption of the first consumer electronic device comprises:
controlling power consumption of one or more specific modules within the first consumer electronic device.

21. The method of claim 20, wherein the step of controlling power consumption of the one or more specific modules comprises:
varying the power consumption of the one or more specific modules within the consumer electronic device in response to a user action while maintaining compliance with the first power restriction command.

22. The method of claim 21, wherein the step of varying the power consumption of the one or more specific modules comprises:
varying at least one of an output characteristic and an operating speed of the one or more specific modules.

23. The method of claim 13, further comprising:
variably assigning all or part of the first power consumption target level to one or more specific modules within the first consumer electronic device based on a user command.

24. The method of claim 13, further comprising:
outputting a message indicating that a requested operation is unable to be performed, if power consumption necessary for the requested operation violates the first power restriction command.

25. A consumer electronic device, comprising:
a communication unit configured to communicate with a power management apparatus controlling a power management network within a building or within one or more rooms of a building; and
a control unit operatively connected to the communication unit, the control unit configured to:
determine a required power level necessary for operation of the consumer electronic device,
receive, from the power management apparatus, a first power restriction command including a first power consumption target level determined by the power management apparatus to be equal to or less than a total power consumption target level of the power management network,
compare the required power level and the first power consumption target level, and
when the first power consumption target level is equal to or higher than the required power level:
determine an operating power between the required power level and the first power consumption target level, and
control power consumption of at least one specific module within the consumer electronic device such that power consumed by the consumer electronic device does not exceed the determined operating power.

26. The consumer electronic device of claim 25, wherein the control unit is configured to transmit, to the power management apparatus, a rejection response used to request a second power restriction command that includes a power consumption target level higher than the first power consumption target level when the first power consumption target level is lower than the required power level.

27. The consumer electronic device of claim 26, wherein the control unit is further configured to:
receive, from the power management apparatus, a second power restriction command including a second power consumption target level in response to the transmitted rejection response, and
degrade a quality of a current operation of the consumer electronic device when the second power consumption target level is lower than the required power level.

* * * * *